US012674400B1

(12) United States Patent
Park et al.

(10) Patent No.: US 12,674,400 B1
(45) Date of Patent: Jul. 7, 2026

(54) FRICTION-REDUCING TURBOCHARGER

(71) Applicant: Savant Holdings LLC, South Jordan, UT (US)

(72) Inventors: Bret J. Park, South Jordan, UT (US); Zackary D. Swasey, Riverton, UT (US)

(73) Assignee: Savant Holdings LLC

( * ) Notice: Subject to any disclaimer, the term of this patent is extended or adjusted under 35 U.S.C. 154(b) by 28 days.

(21) Appl. No.: 18/786,170

(22) Filed: Jul. 26, 2024

(51) Int. Cl.
*F01D 17/16* (2006.01)
*F02B 37/24* (2006.01)

(52) U.S. Cl.
CPC ............ *F01D 17/165* (2013.01); *F02B 37/24* (2013.01); *F05D 2230/60* (2013.01); *F05D 2260/56* (2013.01)

(58) Field of Classification Search
CPC ........ F01D 17/165; F01D 17/16; F02B 37/24; F02B 37/22
See application file for complete search history.

(56) References Cited

U.S. PATENT DOCUMENTS

| | | | |
|---|---|---|---|
| 4,643,640 A | 2/1987 | Burdette et al. | |
| 4,659,295 A | 4/1987 | Burdette et al. | |
| 5,231,831 A | 8/1993 | Leavesley | |
| 6,269,642 B1 | 8/2001 | Arnold et al. | |
| 7,255,530 B2 | 8/2007 | Vogiatzis et al. | |
| 7,322,791 B2 * | 1/2008 | Stilgenbauer | F01D 17/165 415/164 |
| 8,967,955 B2 * | 3/2015 | Barthelet | F01D 17/165 415/166 |
| 8,985,943 B2 | 3/2015 | Groves et al. | |
| 9,017,017 B2 | 4/2015 | Sausse et al. | |
| 9,188,019 B2 * | 11/2015 | Groves | F02C 6/12 |
| 9,429,033 B2 | 8/2016 | Martin et al. | |
| 10,294,856 B2 | 5/2019 | Lotz | |
| 10,927,702 B1 * | 2/2021 | Park | F01D 17/165 |
| 12,209,599 B1 | 1/2025 | Park et al. | |
| 2007/0277525 A1 * | 12/2007 | Stilgenbauer | F01D 17/165 417/407 |

(Continued)

FOREIGN PATENT DOCUMENTS

| | | |
|---|---|---|
| EP | 1418311 A | 5/2004 |
| WO | 2008118833 A1 | 10/2008 |
| WO | 2019105080 A1 | 6/2019 |

OTHER PUBLICATIONS

Arnold, Robert Lucky; 'Wastegate Adjustment, A Closer look' In Matthew's Volvo Site forum [online] apparently published on Nov. 30, 2012, retrieved from the Internet on Jul. 21, 2023, from (shown in attachment 1).

(Continued)

*Primary Examiner* — Courtney D Heinle
*Assistant Examiner* — Behnoush Haghighian
(74) *Attorney, Agent, or Firm* — Austin Rapp

(57) ABSTRACT

A turbocharger or turbocharger component including an annular unison ring, a first nozzle ring, and a set of ball bearings. The annular unison ring is devoid of direct contact with the first nozzle ring and contacts the first nozzle ring only indirectly via the set of ball bearings disposed within the bearing race. An inner insertion recess and an outer insertion recess may be rotationally aligned to form a ball bearing insertion recess, through which a ball bearing of the set of ball bearings may be inserted into the bearing race.

10 Claims, 27 Drawing Sheets

(56) References Cited

U.S. PATENT DOCUMENTS

| | | | |
|---|---|---|---|
| 2015/0322849 | A1 | 11/2015 | Ward |
| 2018/0058247 | A1 | 3/2018 | Karamavruc et al. |

OTHER PUBLICATIONS

Shadzi, Javad; 'An explanation of wastegate function, bigger isn't always bigger.' In VWvortex forum [online] apparently published on Feb. 11, 2008, retrieved from the Internet on Jul. 27, 2023, from (shown in pp. 9-13 of attachment 2).

Office Action, U.S. Appl. No. 18/125,010, mailed on May 7, 2024 (shown in attachment 3).

Applicant-Initiated Interview Summary, U.S. Appl. No. 18/125,010, mailed on Aug. 6, 2024 (shown in attachment 4).

Office Action Response, U.S. Appl. No. 18/125,010, dated Aug. 7, 2024 (shown in attachment 5).

Notice of Allowance and Fee(s) Due (including a Notice of Allowability section), U.S. Appl. No. 18/125,010, Mailed on Sep. 26, 2024 (shown in attachment 6).

* cited by examiner

FRICTION-REDUCING TURBOCHARGER

TECHNICAL FIELD

The present invention relates to actuators for turbochargers and, more particularly, to a reduced-friction turbocharger or turbocharger component.

BACKGROUND

While turbochargers have been available for some time, improvements are still desirable. For example, the friction in a turbocharger can generate extreme heat and cause significant wear and tear on the turbocharger, reducing the life of the turbocharger. Therefore, reducing friction within a turbocharger is desirable.

SUMMARY

Embodiments of the disclosed subject matter are provided below for illustrative purposes and are in no way limiting of the claimed subject matter. Specifically, the two embodiments disclosed herein are merely illustrative and not limiting of the claimed subject matter.

A first embodiment of a turbocharger or turbocharger component is disclosed. The first embodiment may comprise an annular unison ring, which may comprise an outward-facing surface and an outward-facing race disposed on the outward-facing surface. The first embodiment may further comprise a first nozzle ring, which may comprise an inward-facing circular wall. The inward-facing circular wall may comprise an inward-facing race. The inward-facing race and the outward-facing race may define a bearing race. The first embodiment may also comprise a set of ball bearings disposed within the bearing race. When the turbocharger or turbocharger component is in an operational mode, the annular unison ring may rotationally engage the first nozzle ring via the set of ball bearings and the annular unison ring may be devoid of direct contact with the first nozzle ring.

The first embodiment may further comprise a plurality of vane assemblies. Each vane assembly may comprise a vane. Each vane assembly may be engaged with the annular unison ring such that rotation of the annular unison ring may cause rotation of each vane assembly when the turbocharger or turbocharger component is in the operational mode. The annular unison ring may define an inner insertion recess, and the inward-facing circular wall may define an outer insertion recess. The inner insertion recess and the outer insertion recess, when rotationally aligned, may define a ball bearing insertion recess through which a ball bearing of the set of ball bearings may be inserted into the bearing race. In the operational mode, rotation of the annular unison ring relative to the first nozzle ring may be limited such that the inner insertion recess and the outer insertion recess may not be rotationally aligned in this mode.

In the first embodiment, the first nozzle ring may have an outer annular nozzle ring surface and an inner annular nozzle ring surface on a first side of the first nozzle ring. A plurality of vane apertures may extend through the first nozzle ring from the inner annular nozzle ring surface to an opposite annular ring surface disposed on a second side of the first nozzle ring. A rotational recess may be disposed in the outer annular nozzle ring surface and may be disposed adjacent to the annular unison ring. The first embodiment may further comprise a plurality of unison pins which may extend away from a first unison ring surface of the annular unison ring, and an eccentric pin. A unison crank may have a rotational pin rotatably disposed within the rotational recess. The eccentric pin may be coupled to the rotational pin and may be offset from a rotational axis of the unison crank such that rotation of the unison crank about the rotational axis may cause movement of the eccentric pin, which, in turn, may cause the annular unison ring to rotate.

In the first embodiment, each vane assembly may further comprise a proximal shaft with the vane extending away from the proximal shaft. Each vane may comprise a first wing and a second wing. The plurality of vane apertures may be shaped and sized to receive one of the proximal shafts of the plurality of vane assemblies such that each vane assembly may be rotatably disposed in a respective vane aperture about a respective common longitudinal axis. The first embodiment may further comprise plurality of vane arms, wherein each vane arm may have a first end and a second end. Each first end may be pivotally attached to one of the plurality of unison pins of the annular unison ring, and each second end may be fixedly attached to the proximal shaft of one of the vane assemblies such that rotation of the annular unison ring may cause each of the plurality of vane arms to pivot and the vane assemblies to rotate about each respective common longitudinal axis.

In the first embodiment, the unison crank may further comprise a forked member that may engage with the eccentric pin, and the forked member may be integrally formed with at least a portion of the unison crank. The rotational pin may be integrally formed with at least a portion of the unison crank, and the rotational pin may be disposed within a rotational pin recess of the unison crank.

In the first embodiment, the eccentric pin may be integrally formed with at least a portion of the unison crank, and each vane assembly may further comprise a distal shaft. The first embodiment may further comprise a discrete second nozzle ring; a turbine housing; and a plurality of fasteners for removably fixing the discrete second nozzle ring with respect to the turbine housing. The discrete second nozzle ring may comprise a plurality of secondary vane apertures, and each secondary vane aperture may be sized and shaped to receive one of the distal shafts of the plurality of vane assemblies such that each distal shaft may be rotatably disposed in a respective secondary vane aperture. Each vane may be disposed between the first nozzle ring and the discrete second nozzle ring. The first nozzle ring may be repositionable and fixable at different rotational orientations with respect to the discrete second nozzle ring.

In the first embodiment, each vane assembly may further comprise a distal shaft. An integrated second nozzle ring may comprise a portion of a turbine housing. The integrated second nozzle ring may also comprise a plurality of secondary vane apertures. Each secondary vane aperture may be sized and shaped to receive one of the distal shafts of the plurality of vane assemblies such that each distal shaft may be rotatably disposed in a respective secondary vane aperture and, each vane may be disposed between the first nozzle ring and the integrated second nozzle ring.

A method of assembling the first embodiment of the turbocharger or turbocharger component is also disclosed. The turbocharger or turbocharger component may comprise an arcuate gap intermediate the inward-facing race and the outward-facing race. The method may comprise a first stage assembly mode and a second stage assembly mode.

In a first stage assembly mode, an arcuate gap is sufficiently large to enable insertion of a ball bearing of the set of ball bearings into the bearing race regardless of whether the inner insertion recess is rotationally aligned with the outer insertion recess. In a second stage assembly mode, no portion of the arcuate gap is sufficiently large to enable insertion of a ball bearing of the set of ball bearings into the bearing race except through the ball bearing insertion recess formed by rotational alignment of the inner insertion recess in the outer insertion recess. Transitioning from the first stage assembly mode to the second stage assembly mode may be realized as a sufficient number of ball bearings are inserted into the bearing race and positioned to constrain movement of the annular unison ring within the arcuate gap such that no portion of the arcuate gap is sufficiently large to enable insertion of a ball bearing of the set of ball bearings into the bearing race except through the ball bearing insertion recess formed by rotational alignment of the inner insertion recess and the outer insertion recess.

A second embodiment of a turbocharger or turbocharger component is also disclosed. The second embodiment may comprise an annular unison ring, which may comprise an inward-facing surface and an inward-facing race disposed on the inward-facing surface. The second embodiment may further comprise a first nozzle ring which may comprise an outward-facing circular wall. The outward-facing circular wall may comprise an outward-facing race. The outward-facing race and the inward-facing race may define a bearing race. A set of ball bearings may be disposed within the bearing race. When the turbocharger or turbocharger component is in an operational mode, the annular unison ring may rotationally engage the first nozzle ring via the set of ball bearings and the annular unison ring may be devoid of direct contact with the first nozzle ring.

The second embodiment may further comprise a plurality of vane assemblies. Each vane assembly may comprise a vane. Each vane assembly may be engaged with the annular unison ring such that rotation of the annular unison ring causes rotation of each vane assembly when the turbocharger or turbocharger component is in the operational mode. The annular unison ring may define an outer insertion recess.

In the second embodiment, the outward-facing circular wall may define an inner insertion recess. The inner insertion recess and the outer insertion recess, when rotationally aligned, may define a ball bearing insertion recess through which a ball bearing of the set of ball bearings may be inserted into the bearing race. In the operational mode, rotation of the annular unison ring relative to the first nozzle ring may be limited such that the inner insertion recess and the outer insertion recess may not be rotationally aligned in this mode.

In the second embodiment, the first nozzle ring may have an outer annular nozzle ring surface and an inner annular nozzle ring surface on a first side of the first nozzle ring, A plurality of vane apertures may extend through the first nozzle ring from the inner annular nozzle ring surface to an opposite annular ring surface disposed on a second side of the first nozzle ring. A rotational recess may be disposed in the outer annular nozzle ring surface and may be disposed adjacent to the annular unison ring.

In the second embodiment, a plurality of unison pins may extend away from a first unison ring surface of the annular unison ring.

The second embodiment may further comprise an eccentric pin and a unison crank having a rotational pin rotatably disposed within the rotational recess. The eccentric pin may be coupled to the rotational pin and may be offset from a rotational axis of the unison crank such that rotation of the unison crank about the rotational axis causes movement of the eccentric pin, which, in turn, causes the annular unison ring to rotate.

In the second embodiment, each vane assembly may further comprise a proximal shaft, and the vane may extend away from the proximal shaft. Each vane may comprise a first wing and a second wing. The plurality of vane apertures may be shaped and sized to receive one of the proximal shafts of the plurality of vane assemblies such that each vane assembly is rotatably disposed in a respective vane aperture about a respective common longitudinal axis.

The second embodiment may further comprise a plurality of vane arms. Each vane arm may have a first end and a second end, each first end may be pivotally attached to one of the plurality of unison pins of the annular unison ring, and each second end may be fixedly attached to the proximal shaft of one of the vane assemblies such that rotation of the annular unison ring may cause each of the plurality of vane arms to pivot and the vane assemblies to rotate about each respective common longitudinal axis.

In the second embodiment, the unison crank may further comprise a forked member that engages with the eccentric pin. The forked member may be integrally formed with at least a portion of the unison crank.

Within the second embodiment, the rotational pin may be integrally formed with at least a portion of the unison crank. Also, the rotational pin may be disposed within a rotational pin recess of the unison crank, and the eccentric pin may be integrally formed with at least a portion of the unison crank.

In the second embodiment, each vane assembly may further comprise a distal shaft, a discrete second nozzle ring, a turbine housing, and a plurality of fasteners, which removably fix the discrete second nozzle ring with respect to the turbine housing. The discrete second nozzle ring may comprise a plurality of secondary vane apertures. Each secondary vane aperture may be sized and shaped to receive one of the distal shafts of the plurality of vane assemblies such that each distal shaft is rotatably disposed in a respective secondary vane aperture and each vane disposed between the first nozzle ring and the discrete second nozzle ring. The first nozzle ring may be repositionable and fixable at different rotational orientations with respect to the discrete second nozzle ring.

In the second embodiment, wherein each vane assembly may further comprise a distal shaft. The second embodiment may further comprise an integrated second nozzle ring, which may comprise a portion of a turbine housing. The integrated second nozzle ring may comprise a plurality of secondary vane apertures. Each secondary vane aperture may be sized and shaped to receive one of the distal shafts of the plurality of vane assemblies such that each distal shaft is rotatably disposed in a respective secondary vane aperture and each vane disposed between the first nozzle ring and the integrated second nozzle ring.

A method of assembling the second embodiment of the turbocharger or turbocharger component is also disclosed. The turbocharger or turbocharger component may comprise an arcuate gap intermediate the inward-facing race and the outward-facing race. The method may comprise a first stage assembly mode and a second stage assembly mode.

In a first stage assembly mode, an arcuate gap is sufficiently large to enable insertion of a ball bearing of the set of ball bearings into the bearing race regardless of whether the inner insertion recess is rotationally aligned with the outer insertion recess. In a second stage assembly mode, no portion of the arcuate gap is sufficiently large to enable insertion of a ball bearing of the set of ball bearings into the bearing race except through the ball bearing insertion recess formed by rotational alignment of the inner insertion recess in the outer insertion recess. Transitioning from the first stage assembly mode to the second stage assembly mode may be realized as a sufficient number of ball bearings are inserted into the bearing race and positioned to constrain movement of the annular unison ring within the arcuate gap such that no portion of the arcuate gap is sufficiently large to enable insertion of a ball bearing of the set of ball bearings into the bearing race except through the ball bearing insertion recess formed by rotational alignment of the inner insertion recess and the outer insertion recess.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 10A top perspective view of the first nozzle ring and annular unison ring shown with a few ball bearings are inserted into the bearing race;

Figure 1:
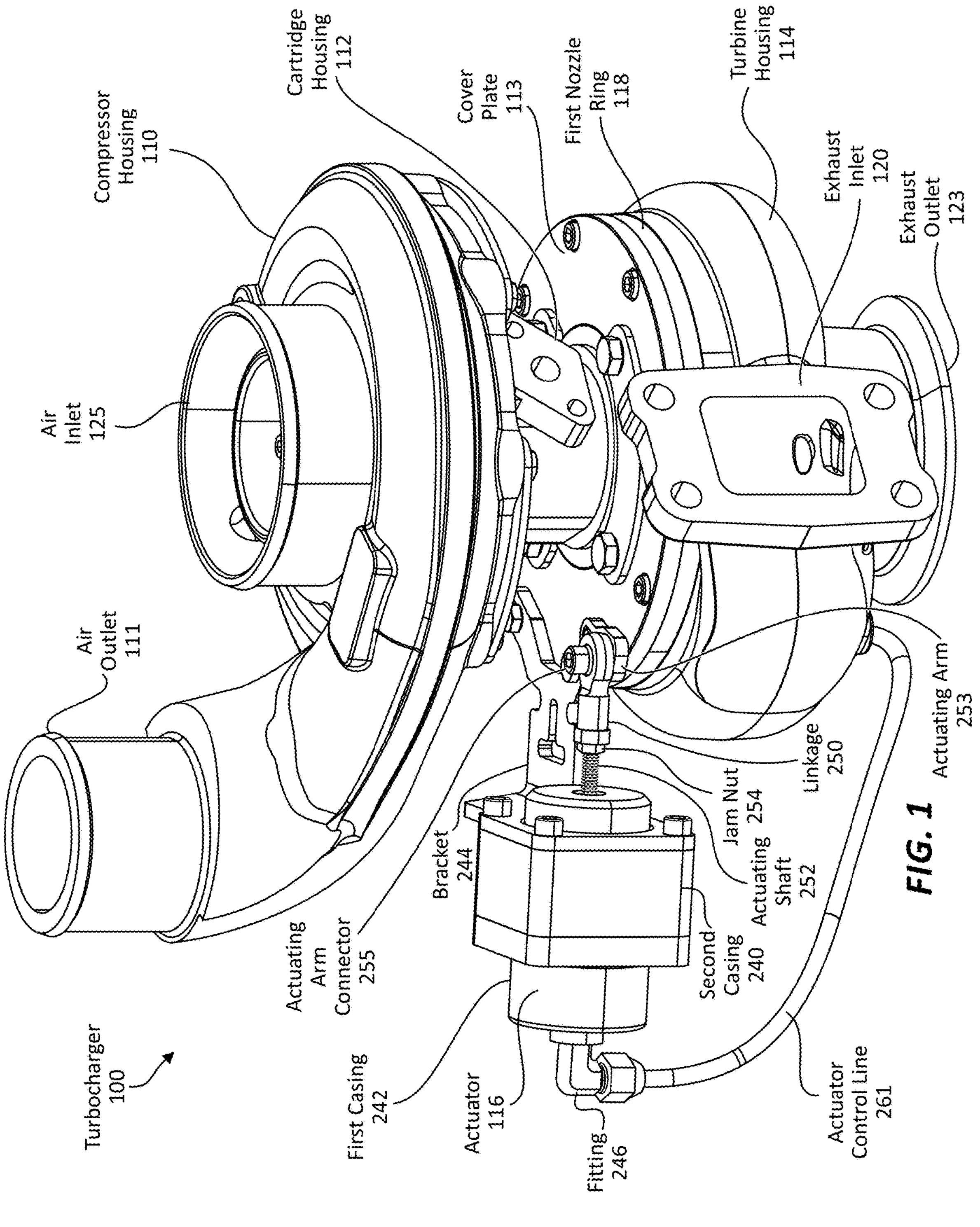
FIG. 1 is a perspective view of one embodiment of a turbocharger.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms that may be used in this application. Additional definitions may be provided in the context of the discussion of the figures herein. As used herein, "exemplary" can indicate an example, an implementation, and/or an aspect of the disclosed subject matter and does not signify a preferred implementation.

Further, it is to be appreciated that certain ordinal terms (e.g., "first" or "second") can be provided for identification and case of reference and may not necessarily imply physical characteristics or ordering. Therefore, as used herein, an ordinal term (e.g., "first," "second," "third") when used to modify an element (such as a structure, a component, an operation, etc.) does not indicate priority or order of the element with respect to another element, but rather distinguishes the element from another element having a same name (but for use of the ordinal term) unless otherwise expressly indicated.

In addition, as used herein, indefinite articles ("a" and "an") can indicate "one or more" rather than "one."

As used herein, a structure or operation that "comprises" or "includes" or "has" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited.

As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter.

An enumerated listing of items recited in connection with an embodiment of the invention does not imply that any or all of the items are mutually exclusive and/or mutually inclusive of one another unless expressly specified otherwise.

The phrases "coupled," "coupled to," and "secured to" refer to any form of direct or indirect mechanical connection between items, including connections that use intermediary items or connectors, such as bolts or screws and integral formation of the items.

The phrase "pivotally coupled to" refers to forms of mechanical coupling that permits the two coupled items to pivot with respect to one another. The phrase "slidably coupled to" refers to forms of mechanical coupling that permits the two coupled items to slide with respect to one another. The phrase "fixedly coupled to" refers to forms of mechanical coupling such that movement, rotation, or pivoting of one of the coupled items results in a corresponding movement of the other coupled item(s). The phrase "secured between" refers to a specified item being fixedly disposed between two other items. The phrase "slidably positioned within" signifies that a first specified item may slide with respect to a specified second item.

The phrase "coupled directly to" refers to a form of attachment or coupling by which the coupled items are either in direct contact, or are only separated by a single fastener, adhesive, or other attachment or coupling mechanism. The term "abut" refers to items that are in direct physical contact with each other, although the items may be coupled, attached, secured, fused, or welded together.

The term "integrally formed" refers to a body that is manufactured integrally, i.e., as a single piece, without requiring the assembly of multiple pieces. Multiple parts may be integrally formed with each other if they are formed from a single workpiece. The term "non-integrally formed" signifies that two identified items are separately manufactured (e.g., either by different manufacturing processes, by the same manufacturing process at different times and/or locations).

As used herein, the term "substantially coaxially aligned" signifies that two items are aligned such that the items share a common, imaginary axis (or are within 15° of sharing the same common, imaginary axis) extending through both of the items, although the items may be spaced apart along that common, imaginary axis.

In various embodiments, the term "offset and substantially coaxially aligned" signifies that two items are aligned such that they share a common, imaginary axis (or are within 15° of sharing the same common, imaginary axis) extending through both of the items and the center points of the items along the common, imaginary axis and are spaced apart along the common, imaginary axis.

In various embodiments, "overlapping and substantially coaxially aligned" signifies that two items are aligned such that they share a common, imaginary axis (or are within 15° of sharing the same common, imaginary axis) extending through both of the items and the items overlap along the common, imaginary axis.

In various embodiments, "coextensive and substantially coaxially aligned" signifies that two items are aligned such that they share a common, imaginary axis (or are within 15° of sharing the same common, imaginary axis) extending through both of the items and the items are coextensive along the common, imaginary axis.

As used herein, the term "generally" indicates that a particular item is within 15° of a specified orientation or value. As used herein, the term "substantially" indicates that a particular value is within 15% of a specified value. For example, the phrase "substantially parallel," as used herein, signifies that the pertinent members, components, or items that are "substantially parallel" to each other are within 15° of being perfectly parallel to each other.

As used herein, in various embodiments, the term "center point nonalignment" when used to identify a relative position of items, features or components along a designated axis signifies that the center points of each of the two identified items are not aligned along a designated axis. In various embodiments, the term "outer boundary nonalignment" may be used to signify that the outer boundaries of two items do not overlap along a designated axis. The term "nonaligned positions" indicates that two items are not aligned along at least one axis and may refer, for example, to either center point nonalignment or outer boundary nonalignment.

In the figures, certain components may appear many times within a particular drawing. However, only certain instances of the components may be identified in the figures to avoid undue proliferation of reference numbers and lead lines. According to the context provided in the description while referring to the figures, reference may be made to a specific one of that particular component or multiple instances, even if the specifically referenced instance or instances of the component are not identified by a reference number and lead line in the figures.

In addition, the following description, the figures may be discussed in groups of two or more figures. Within each group, each reference number included in the description will appear within at least one figure within the group, but not necessarily in all of the figures, again, to avoid the undue proliferation of reference numbers within the figures.

Related parts may be identified with an alphabetic suffix to the reference numeral. For example, if a part is assigned the reference numeral 700, a related, but nonidentical part may be assigned a reference numeral 700*a*.

FIGS. 1-2

Figure 2:
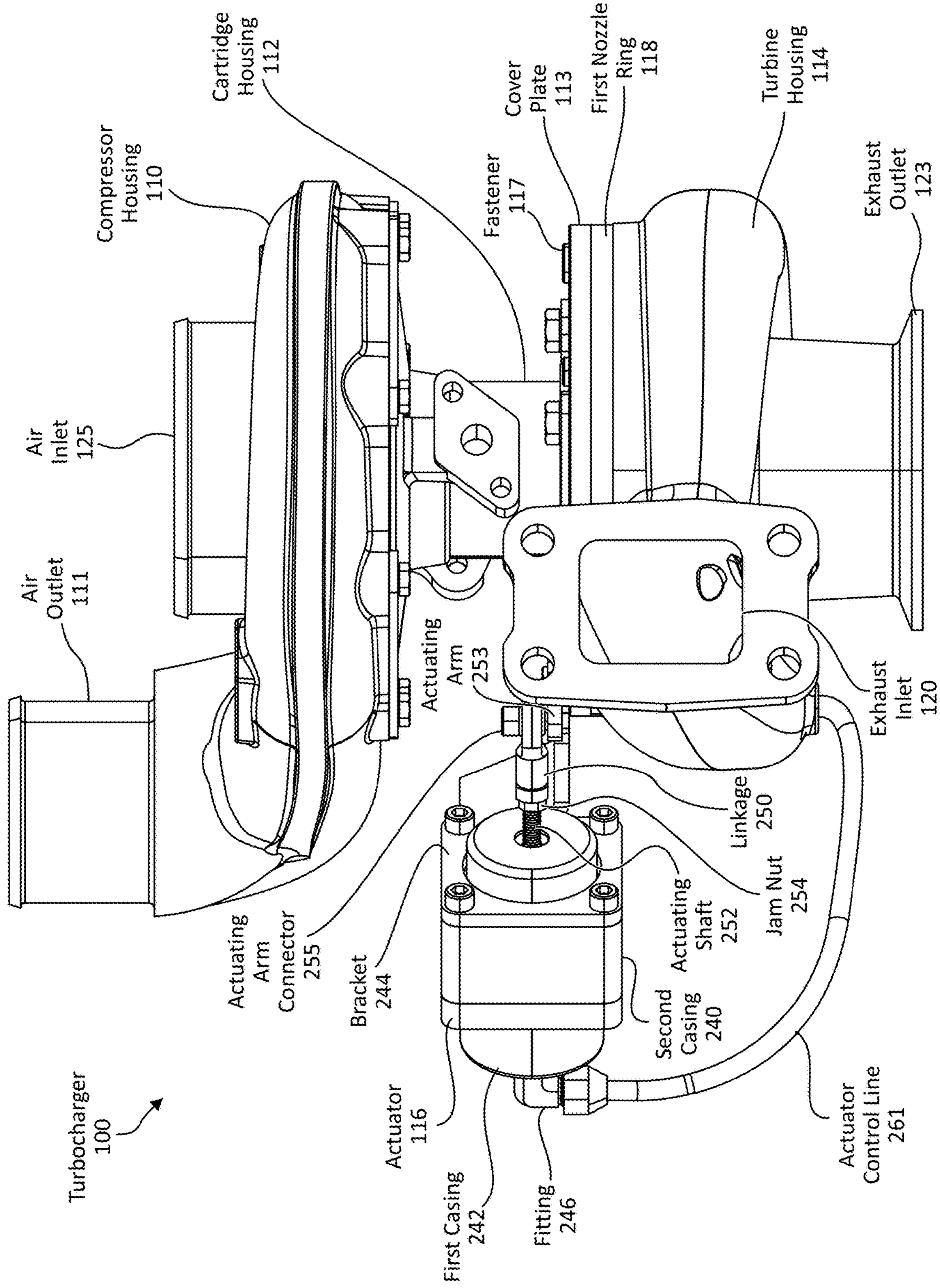
FIG. 2 is a side, elevational view of the actuator shown in FIG. 1.
Figure 3A:
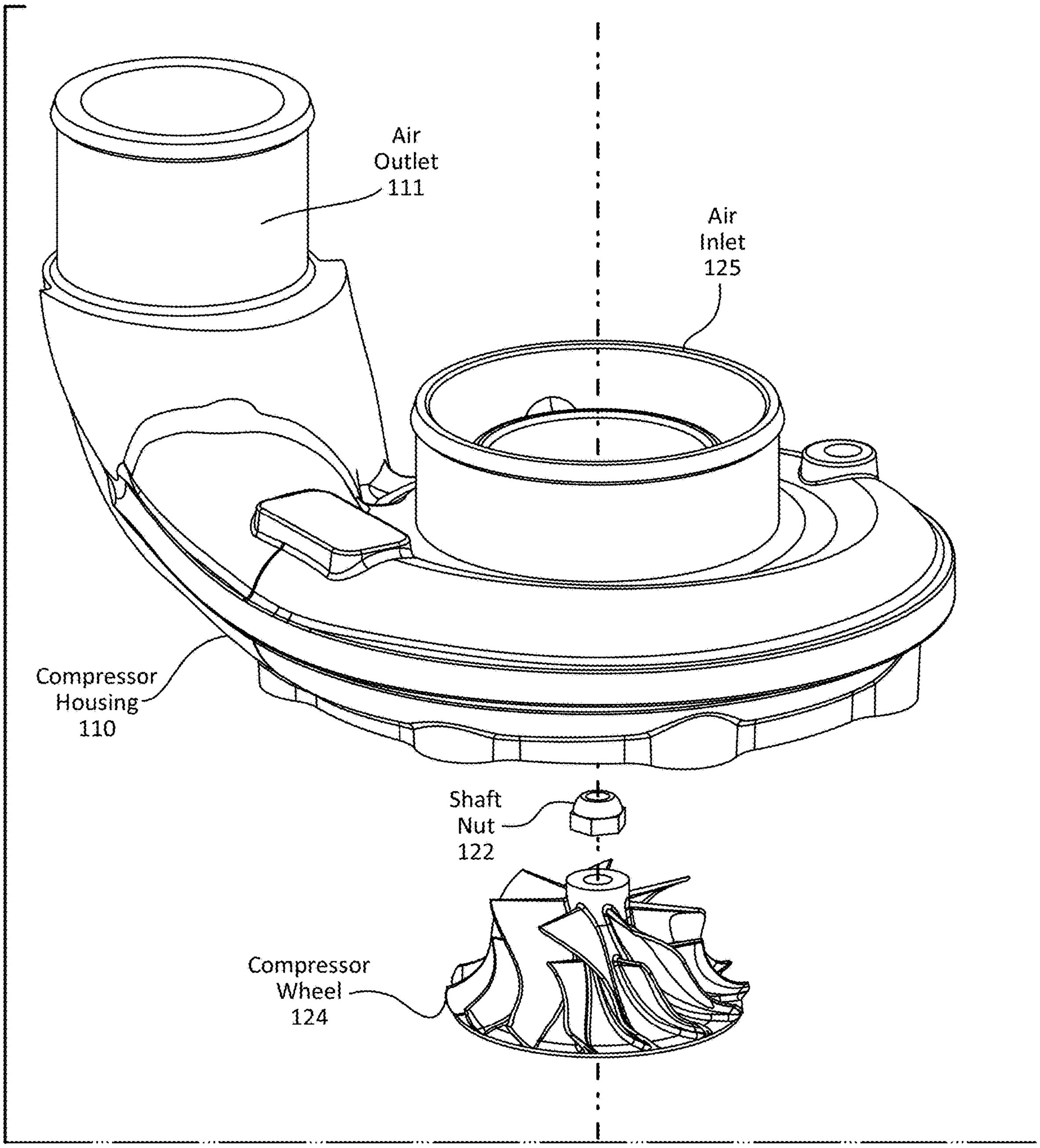
FIGS. 3A-3D jointly comprise a perspective, exploded view a portion of the turbocharger shown in FIG. 1.
Figure 3B:
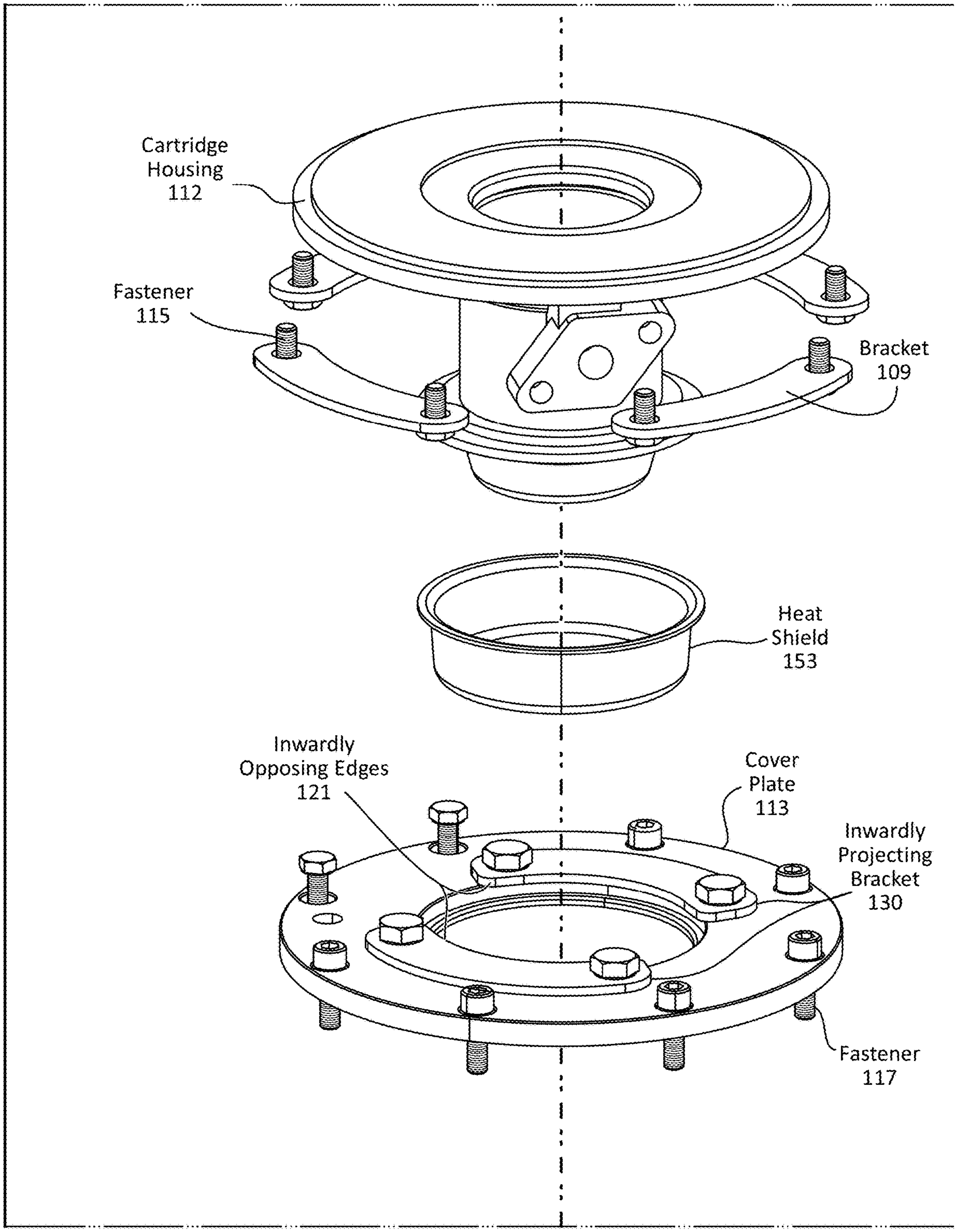
Figure 3C:
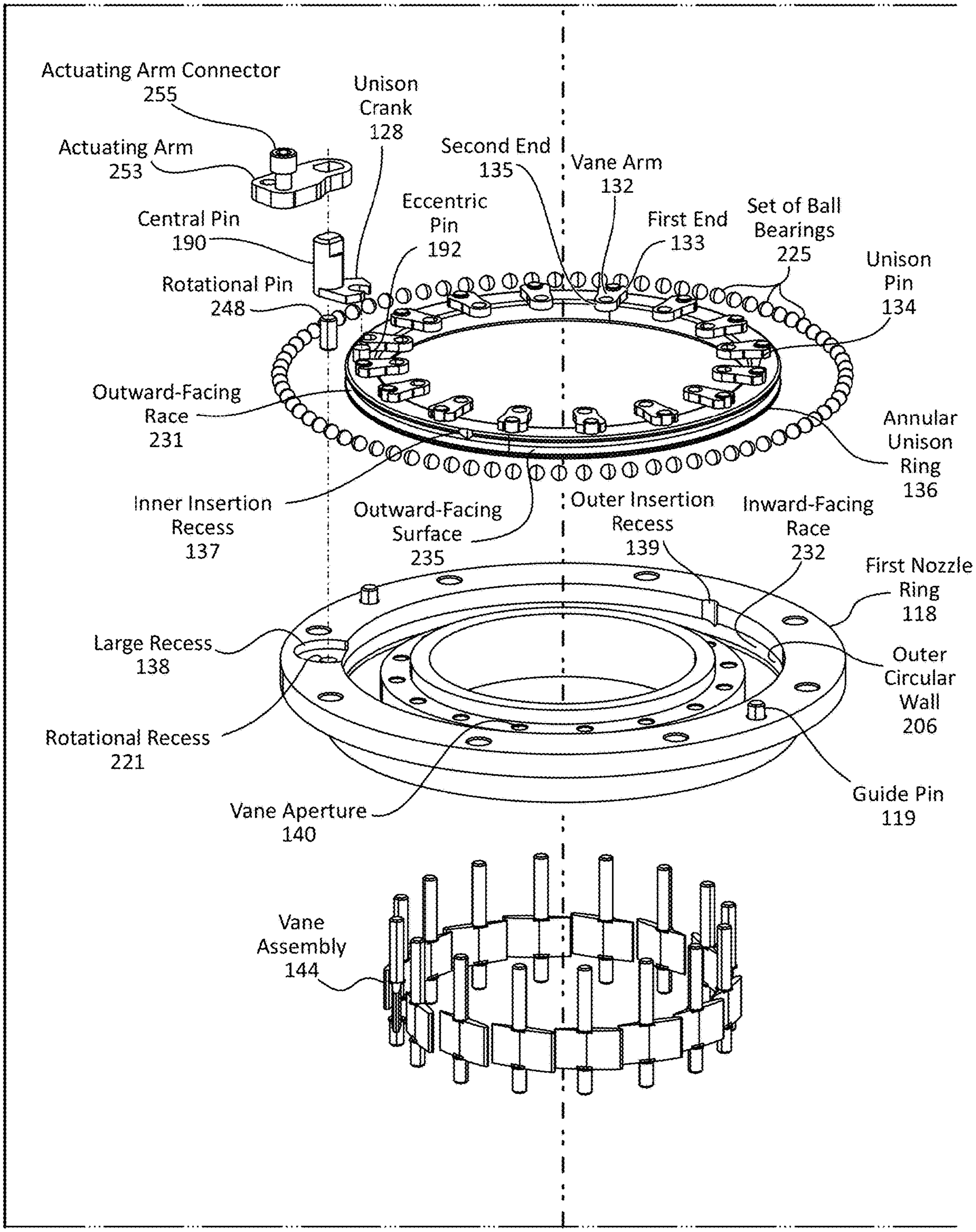
Figure 3D:
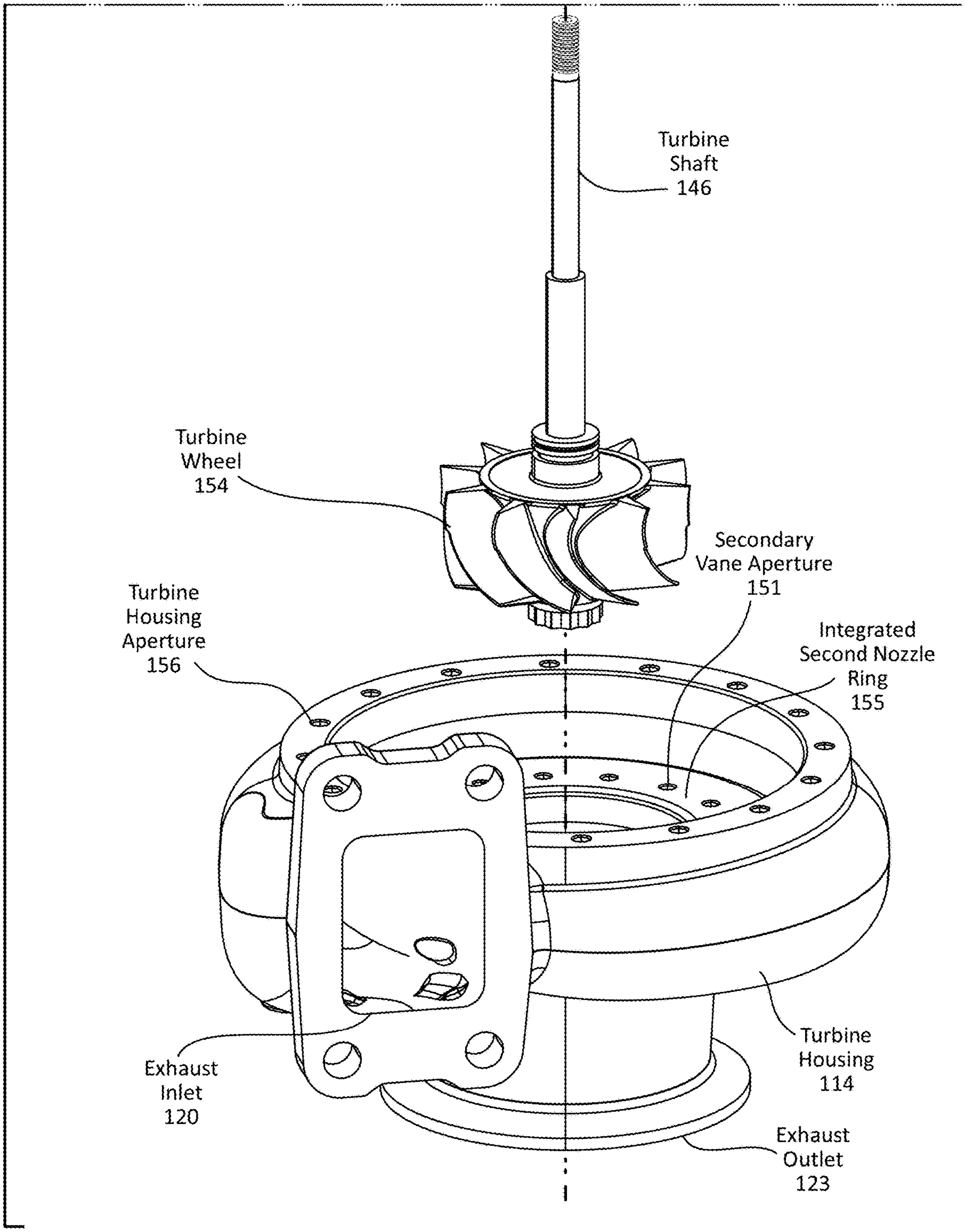

FIG. 1 is a perspective view of one embodiment of a turbocharger 100, while FIG. 2 is a side, elevational view of the embodiment of the turbocharger 100 shown in FIG. 1. FIGS. 1-2 will be discussed collectively. The turbocharger 100 may comprise a compressor housing 110 having an air inlet 125, an air outlet 111, a cartridge housing 112, a cover plate 113, a turbine housing 114 having an exhaust inlet 120, an exhaust outlet 123, a first nozzle ring 118, and an actuator 116.

Speaking broadly, the turbocharger 100 may be utilized, for example, to receive exhaust from an engine through the exhaust inlet 120 of the turbine housing 114 (with the exhaust exiting the turbine housing 114 through the exhaust outlet 123) and then provide pressurized fluid (e.g., exhaust and/or air) from the compressor housing 110 via the air outlet 111 to an intake manifold of the engine to increase the power output of the engine. The air enters the compressor housing 110 via the air inlet 125. As used herein, the term "exhaust" refers to air and/or particulate matter generated by operation of a combustion engine.

The cartridge housing 112 may be used to secure the compressor housing 110 to the turbine housing 114. Fasteners 117 may be used to secure the cover plate 113 and first nozzle ring 118 to the turbine housing 114.

The actuator 116 may be employed to control a set of vane assemblies (illustrated and discussed subsequently) that regulate exhaust flow through the turbine housing 114.

As illustrated, the actuator 116 may comprise a first casing 242 and a second casing 240. The actuator 116 may be secured to a cover plate 113 using a bracket 244. Exhaust from the turbine housing 114 may enter the actuator 116 by an actuator control line 261 and a fitting 246. An actuating shaft 252 is moved to different axial positions in response to the pressure of the exhaust provided to the actuator by the actuator control line 261 and the fitting 246. The actuator control line 261, as illustrated in FIGS. 1 and 2, is utilized to transfer exhaust from the turbine housing 114 into the actuator 116. Therefore, the actuator control line 261 is coupled to and in fluid communication with the turbine housing 114. In alternative embodiments, the actuator control line 261 may be coupled to and in fluid communication with, for example, the compressor housing 110 or a controller specifically designed to provide a desired fluid pressure to the actuator 116 in response to one or more detected conditions within an associated engine.

A jam nut 254 rotatably engages threads on the actuating shaft 252 and impinges on the linkage 250 to fix an axial position of the linkage 250 with respect to the actuating shaft 252. Therefore, the axial position of the linkage 250 relative to the actuating shaft 252 may be adjustable and may be altered by repositioning the linkage 250 and jam nut 254.

The actuating shaft 252 is coupled to the actuating arm 253 using an actuating arm connector 255. Linear movement of the actuating shaft 252 causes an actuating arm 253 to pivot, which, as will be explained in additional detail below, causes a set of vane assemblies to pivot, thereby altering the amount of exhaust, angle of entry of the exhaust, and angle of impact of the exhaust on a turbine wheel 154.

It should be noted that the turbocharger 100 illustrated in FIGS. 1 and 2 serves as only one possible embodiment of the disclosed subject matter. For example, the shape and size of the compressor housing 110, cartridge housing 112, and turbine housing 114 may be varied within the scope of the disclosed subject matter. Also, various types of actuators may be utilized within the scope of the disclosed subject matter, such as electronic, pneumatic, or hydraulic actuators.

FIGS. 3A-5C

Figure 4A:
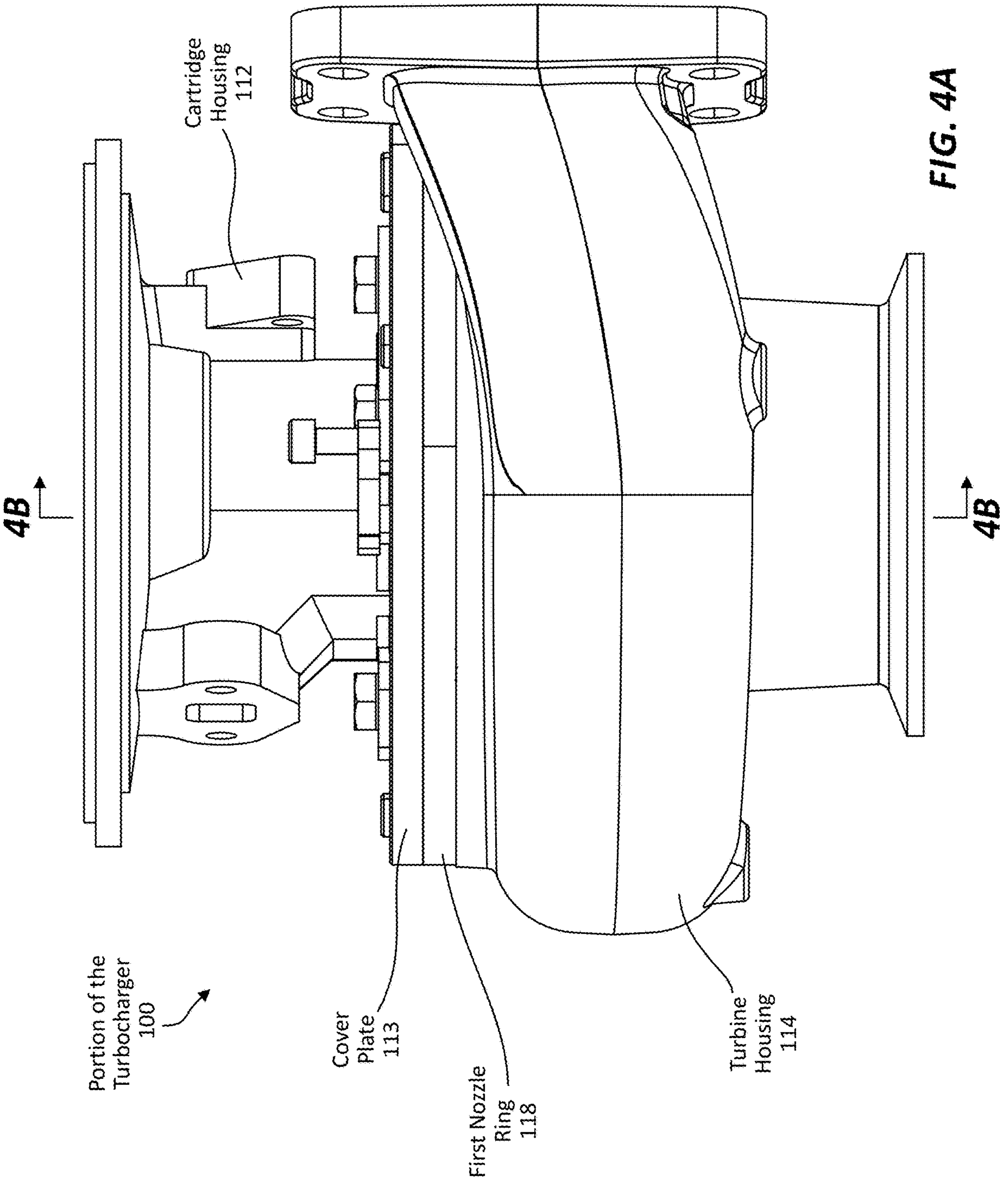
FIG. 4A is a side elevational view of a portion of the turbocharger shown in FIG. 1.
Figure 4B:
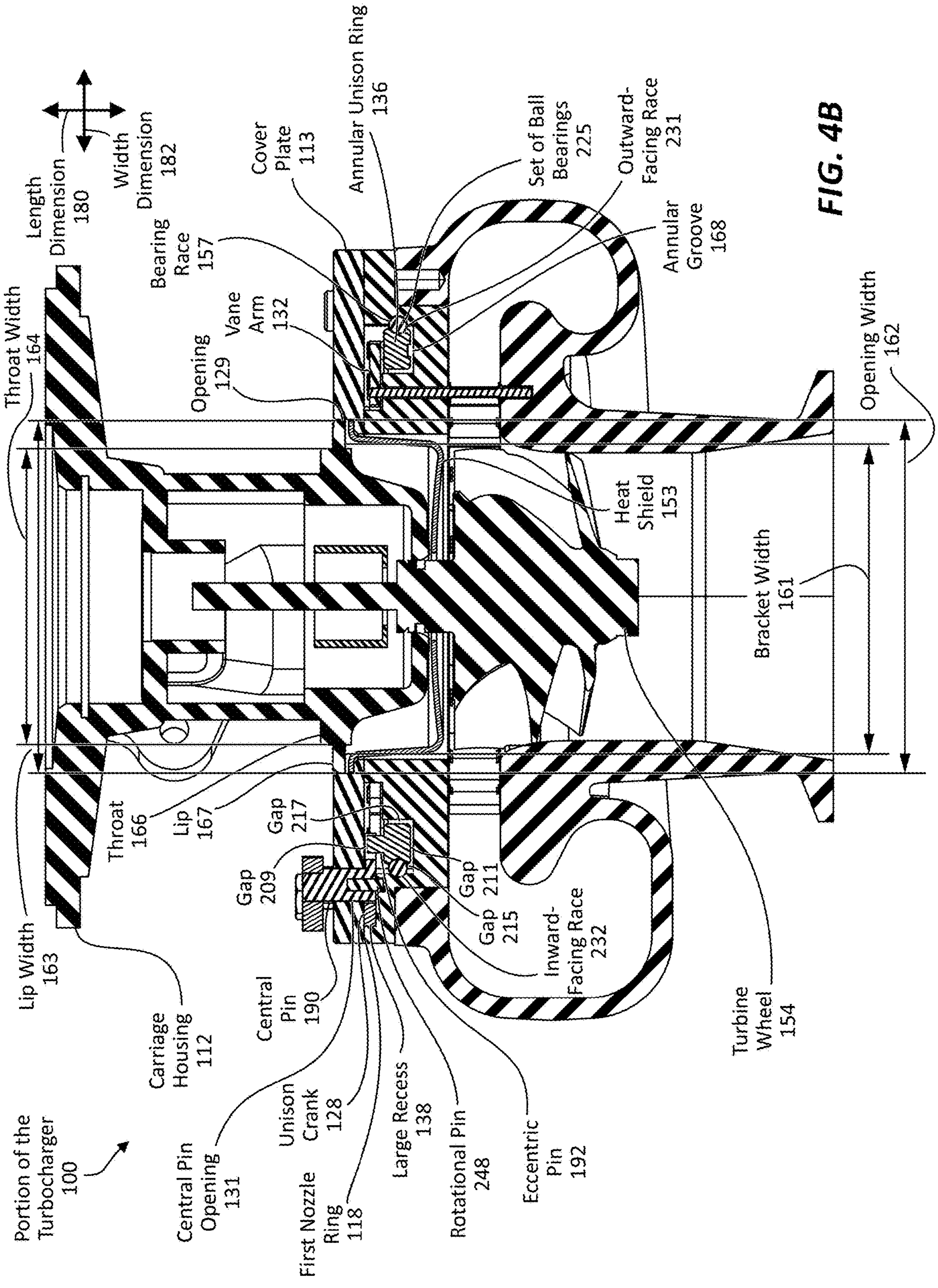
FIG. 4B is a side, cross-sectional view of the portion of the turbocharger shown in FIG. 4A taken across the line 4B-4B.
Figure 5A:
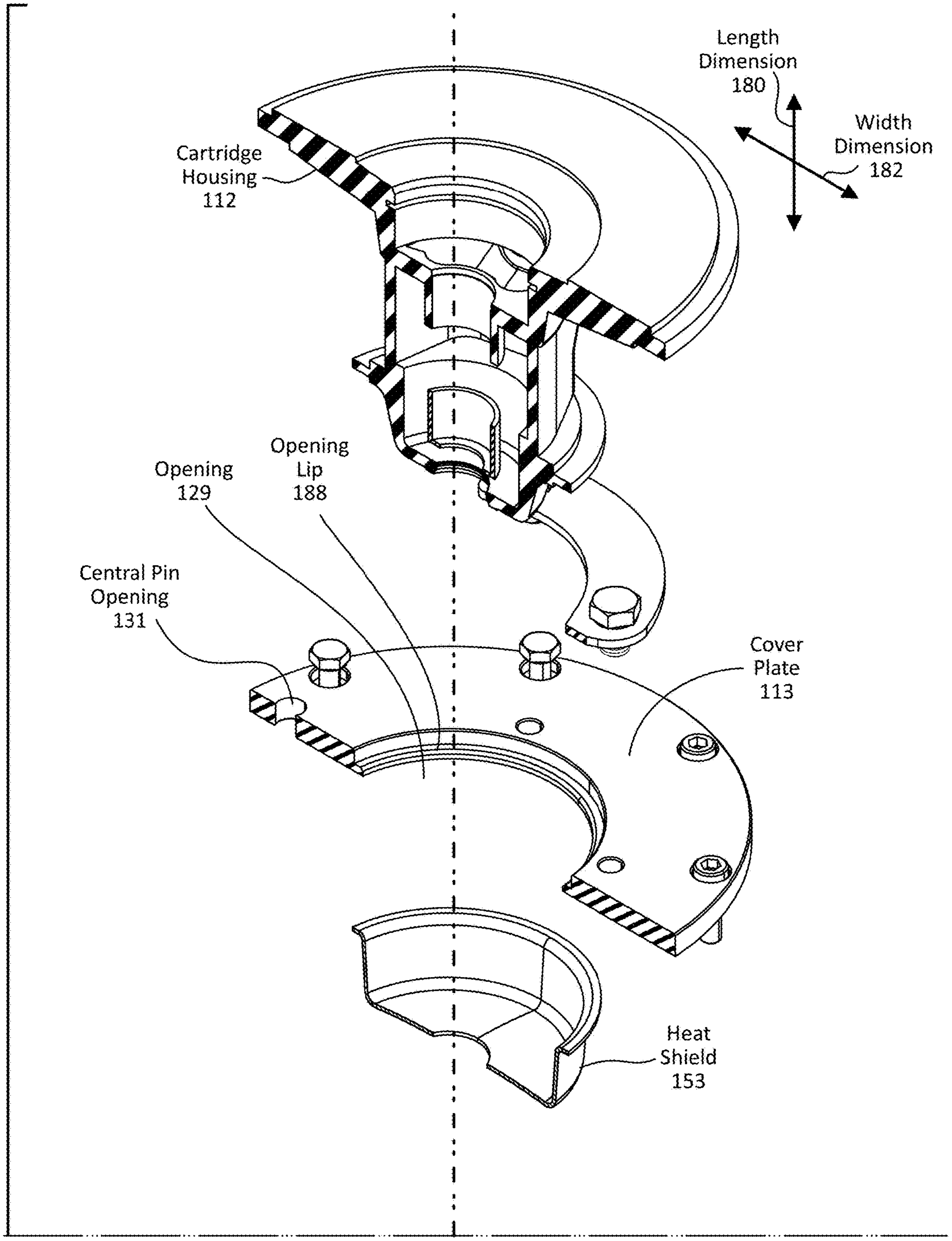
FIGS. 5A-5C jointly comprise an exploded, cross-sectional view of the portion of the turbocharger shown in FIG. 4B.
Figure 5B:
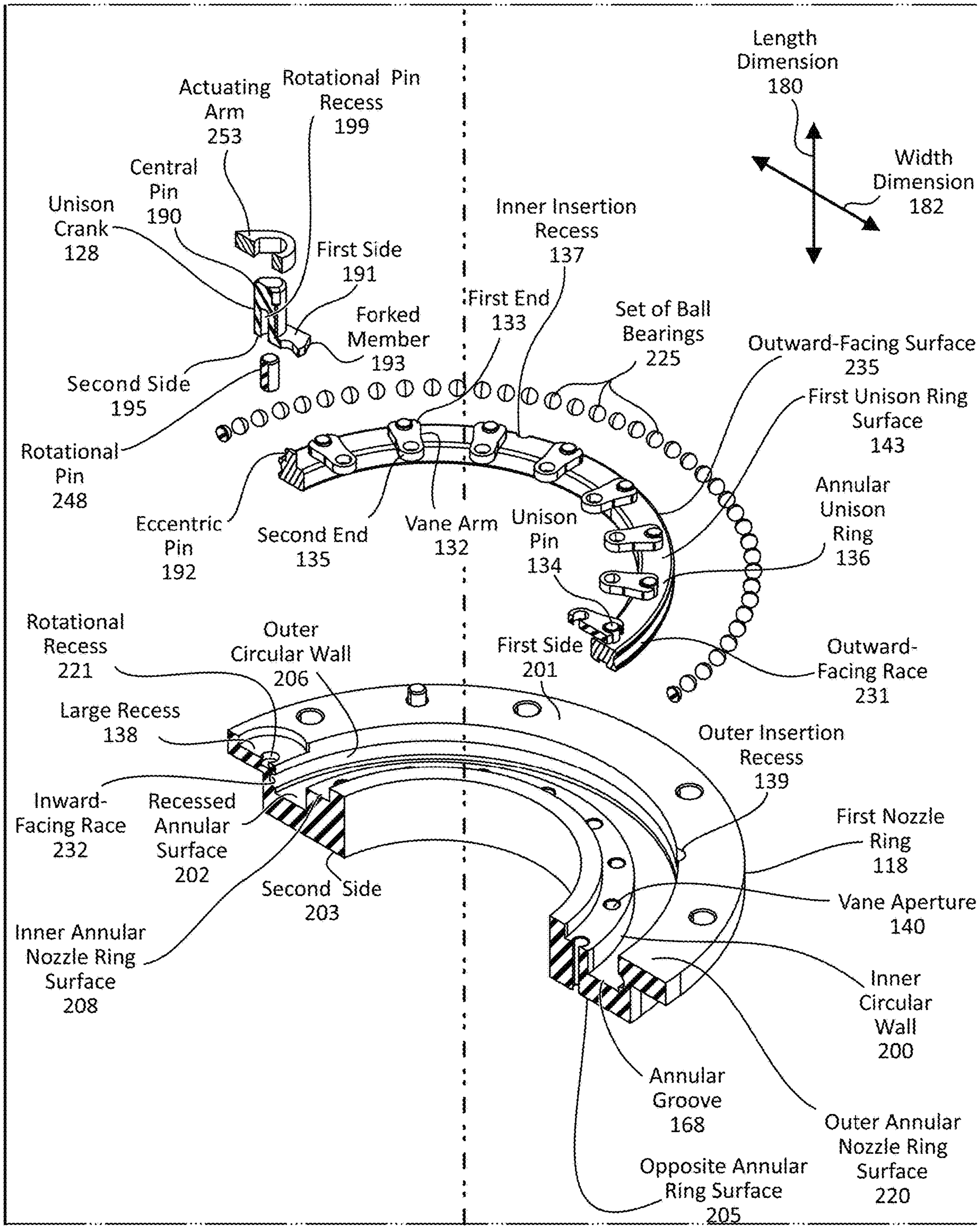
Figure 5C:
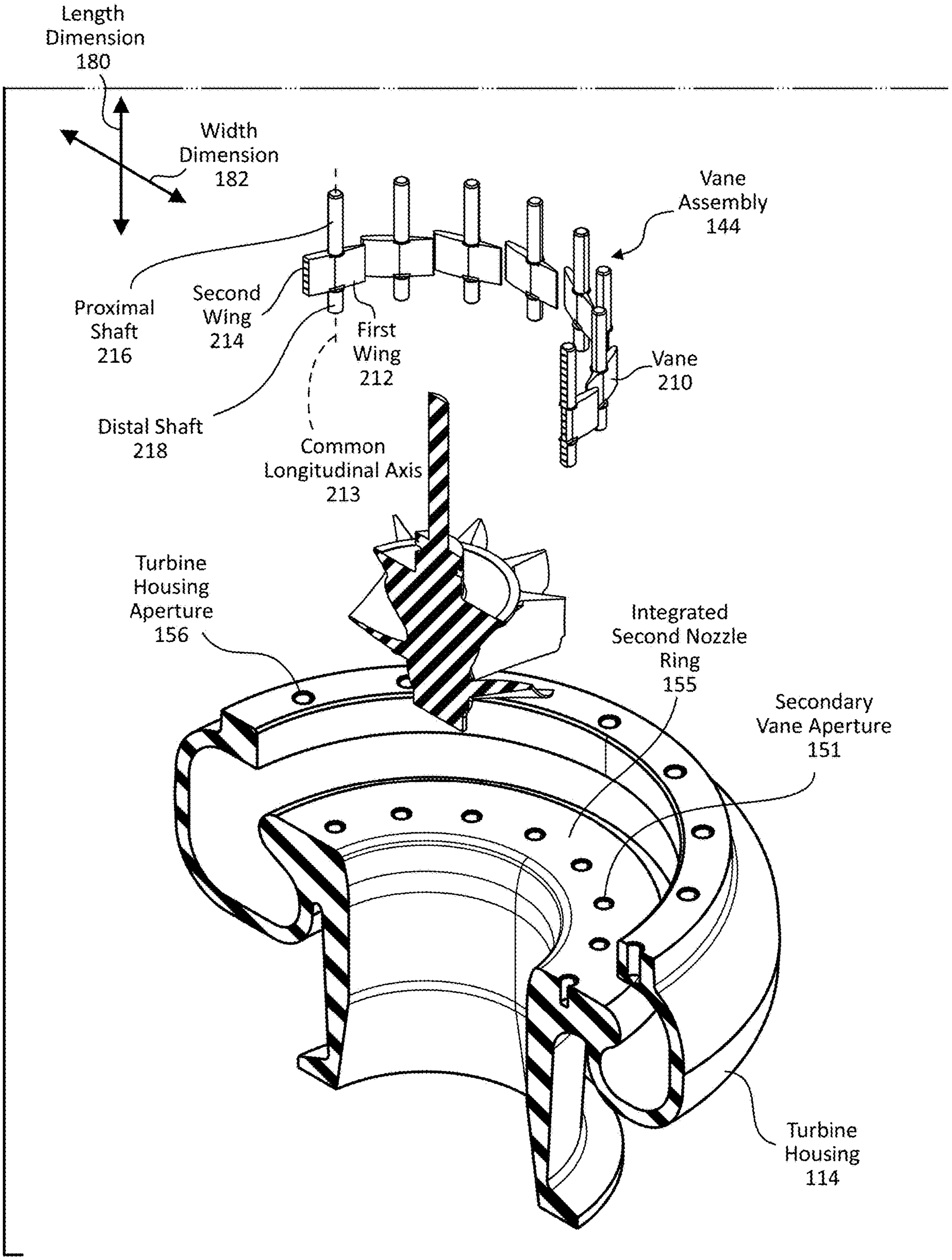

FIGS. 3A-3D jointly comprise a perspective, exploded view of the embodiment of the turbocharger 100 illustrated in FIGS. 1-2. FIG. 4A is a side elevational view of a portion of the embodiment of the turbocharger 100 shown in FIGS. 1-2. FIG. 4B is a side, cross-sectional view of the portion of the turbocharger 100 shown in FIG. 4A taken across the line 4B-4B. FIGS. 5A-5C jointly comprise a partial cross-sectional, exploded view of the portion of the turbocharger 100 shown in FIG. 4B. These figures will be discussed collectively. As utilized herein, the term turbocharger component (e.g., a portion of a turbocharger shown in FIG. 4B) refers to a subset of components of a turbocharger 100 (e.g., a turbocharger without an actuator 116).

It should be noted, as indicated above, that, for simplicity, not all features of the turbocharger 100 are illustrated in the figures. In addition, it should be noted that the actuator 116, actuating arm 253, linkage 250, fitting 246, and actuator control line 261 are not illustrated in FIGS. 3A-5C.

It should also be noted that all of the components referenced in the discussion of FIGS. 3A-5C will not be labeled with a reference numeral in each figure. However, a reference numeral will identify each discussed component in at least one of FIGS. 3A-5C.

It should also be noted that FIGS. 4A-5C illustrate only a portion of the turbocharger 100. Thus, in these figures, for example, the compressor housing 110, air outlet 111, shaft nut 122, linkage 250, actuator 116, fitting 246, actuator control line 261 and compressor wheel 124 have been omitted to better illustrate the remaining components.

As illustrated in these figures, the turbocharger 100 comprises a compressor housing 110 having an air inlet 125 and an air outlet 111. A compressor wheel 124 may be positioned and secured on the turbine shaft 146 with the shaft nut 122. The compressor wheel 124 propels the air entering through the air inlet 125 through the compressor housing 110 and out through the air outlet 111. The compressor wheel 124 is coupled to the turbine wheel 154 by the turbine shaft 146. The turbine wheel 154 rotates in response to exhaust impinging on the turbine wheel 154.

The cartridge housing 112 and heat shield 153 may be secured to the compressor housing 110 utilizing a set of one or more brackets 109 (e.g., C-shaped brackets) and fasteners 115 (e.g., a threaded bolt).

A pair of inwardly projecting brackets 130 comprise inwardly opposing edges 121 that define a bracket width 161 when the inwardly projecting brackets 130 are used to secure the cover plate 113 to the cartridge housing 112. The cover plate 113 may comprise a central pin opening 131. In addition, one or more fasteners 117 may be positioned within turbine housing apertures 156 to secure the cover plate 113 and first nozzle ring 118 to the turbine housing 114. The fasteners 117 may comprise, for example, threaded bolts. In addition, a set of one or more guide pins 119 may be positioned in one or more of the turbine housing apertures 156. Accordingly, the turbine housing apertures 156 may be threaded to receive, for example, the fasteners 117 or may be smooth to receive the guide pins 119. The guide pins 119 may be separate from or integrally formed with the cover plate 113. The guide pins 119 may be used to properly orient the cover plate 113 with respect to the turbine housing 114 while the fasteners 117 are secured in place. In various embodiments, an actuating arm 253 may pivot around a central pin 190. The central pin 190 may extend through the cover plate 113 utilizing the central pin opening 131. An actuating arm connector 255 (which may comprise, for example, a socket head screw (as illustrated in FIGS. 1-2), a nut and bolt assembly, or a rod with an annular recess for receiving a retaining ring or nut-and-bolt) may be used to pivotally couple the linkage 250 to actuating shaft 252. The linear movement of the linkage 250 and the actuating shaft 252 will cause the actuating arm 253 to pivot. The pivoting motion of the actuating arm 253 may be translated into rotational movement of a unison crank 128 (discussed and illustrated subsequently) with the unison crank 128 being disposed for rotational movement (i.e., rotatably disposed) in the large recess 138 of the first nozzle ring 118. A rotational pin 248 may be rotatably disposed in a rotational recess 221 and may be used to facilitate rotation of the unison crank 128. Furthermore, the unison crank 128 may be mechanically coupled to an annular unison ring 136 such that rotational movement of the annular unison ring 136 may be translated into rotation of each vane assembly 144 when the annular unison ring 136 is rotatably disposed in the first nozzle ring 118.

The large recess 138 may be configured in various ways. For example, it may have a partial circular shape, as illustrated in the figures, or, alternatively, may have a generally triangular shape.

Rotation of each vane assembly 144 is made possible because a first end 133 of each vane arm 132 may be pivotally coupled to one of the unison pins 134 and a second end 135 of each vane arm 132 may be fixedly coupled to each vane assembly 144.

Each vane assembly 144 may be rotatably disposed in a vane aperture 140 of the first nozzle ring 118 and a secondary vane aperture 151 of an integrated second nozzle ring 155 and mechanically coupled to the annular unison ring 136 via each vane arm 132.

Rotational movement of the annular unison ring 136 within the first nozzle ring 118 causes each vane arm 132 to pivot with respect to each vane assembly 144, thereby causing each vane assembly 144 to rotate within a respective vane aperture 140 and a respective secondary vane aperture 151. The rotation of the vane assemblies 144 regulates the amount of the exhaust, and the speed and angle of the exhaust flow between the first nozzle ring 118 and the integrated second nozzle ring 155 and impinge upon the turbine wheel 154, thereby regulating the rotation of the turbine wheel 154.

The annular unison ring 136 may comprise, for example, an outward-facing surface 235 having an outward-facing race 231. The first nozzle ring 118 may comprise an outer circular wall 206 having an inward-facing race 232. The inward-facing race 232 and the outward-facing race 231 may define a bearing race 157 for receiving a set of ball bearings 225. For the sake of clarity, it should be noted that curved lines depicted on many of the ball bearings in the set of ball bearings 225 are merely contour lines to demonstrate the spherical shape of the ball bearings in the set of ball bearings 225.

The set of ball bearings 225 reduce friction and thereby reduce heat buildup in and wear on the turbocharger 100 or turbocharger component.

Continuing with reference to FIGS. 4A-5C, the illustrated cartridge housing 112 may comprise a throat 166 and a lip 167. The lip 167 may have a lip width 163 (along the width dimension 182) and the throat 166 may have a throat width 164 (also along the width dimension 182). The lip width 163 is greater than the throat width 164. The cover plate 113 includes an opening 129 having an opening width 162. The lip width 163 may be less than or equal to the opening width 162. The inwardly projecting brackets 130 define a bracket width 161 when the inwardly projecting brackets 130 are secured to the cover plate 113. The bracket width 161 is less than the lip width 163 but greater than or equal to the throat width 164 such that the lip 167 is retained within the opening 129 when the inwardly projecting brackets 130 are secured to the cover plate 113. In various embodiments, the cover plate 113 may comprise an opening lip 188 to limit movement of the lip 167 of the cartridge housing 112 along the length dimension 180 when the lip 167 is secured by the inwardly projecting brackets 130.

The unison crank 128 may comprise a forked member 193 having a first side 191 and a second side 195. A central pin 190 extends from the first side 191, and the central pin 190 is centrally disposed on the first side 191. The annular unison ring 136 may comprise an eccentric pin 192, which may be mechanically coupled with the forked member 193. The central pin 190 may be rotatably positioned within a central pin opening 131 of the cover plate 113.

Additionally, a second side 195 of the central pin 190 may comprise a rotational pin recess 199 which may removably house a portion of a rotational pin 248 in conjunction with the rotational recess 221, which is disposed within the large recess 138.

In various embodiments, and as illustrated, when the annular unison ring 136 is rotatably disposed in the annular groove 168 and the eccentric pin 192 is positioned within the forked member 193, rotation of the unison crank 128 will cause the annular unison ring 136 to rotate within the annular groove 168 causing rotation of the set of ball bearings 225 along the outward and inward-facing races 231, 232 which together define the bearing race 157.

The annular unison ring 136 comprises a series of unison pins 134 extending away from a first unison ring surface 143. A vane arm 132 is slidably coupled to each unison pin 134 and is fixedly coupled to a vane assembly 144. The unison pins 134 may be integrally formed with the annular unison ring 136 or may be separately formed and engage the annular unison ring 136.

As illustrated, a first side 201 of the first nozzle ring 118 may comprise an outer annular nozzle ring surface 220, an annular groove 168, and an inner annular nozzle ring surface 208. A second side 203 of the first nozzle ring 118 is disposed opposite the first side 201. The second side 203 may comprise an opposite annular ring surface 205. Each vane aperture 140 may extend through the first nozzle ring 118 from the inner annular nozzle ring surface 208 to the opposite annular ring surface 205. The large recess 138 is disposed in the outer annular nozzle ring surface 220.

The annular groove 168 comprises an inner circular wall 200, a first recessed annular surface 202, and an outer circular wall 206, which comprises the inward-facing race 232. The first recessed annular surface 202 is offset from the outer annular nozzle ring surface 220 along the length dimension 180 and is disposed between the inner circular wall 200 and the outer circular wall 206. In various embodiments, the first recessed annular surface 202 may be substantially parallel to the outer annular nozzle ring surface 220.

Each vane assembly 144 may comprise a proximal shaft 216, a distal shaft 218, and a vane 210. The proximal shaft 216 and the distal shaft 218 may extend along or be coaxial with a common longitudinal axis 213. The vane 210 may be disposed intermediate the proximal shaft 216 and the distal shaft 218. As illustrated, each vane 210 may comprise a first wing 212 and a second wing 214, each of which may extend away from the common longitudinal axis 213. As illustrated, the first wing 212 and the second wing 214 are symmetrical about the common longitudinal axis 213. In various alternative embodiments, the wings 212, 214 may be of a symmetrical shape that is different than the shape illustrated in the figures, or one wing 212, 214 may be longer than the other or may have a different shape than the other or may be of other asymmetrical shapes. Also, each of the wings 212, 214 may be embodied in different ways and may not necessarily extend directly opposite one another relative to the common longitudinal axis 213. Also, in various embodiments, the vane 210 may comprise a single wing or component.

The integrated second nozzle ring 155 comprises a plurality of secondary vane apertures 151 for receiving a remote end of the distal shaft 218.

Figure 6:
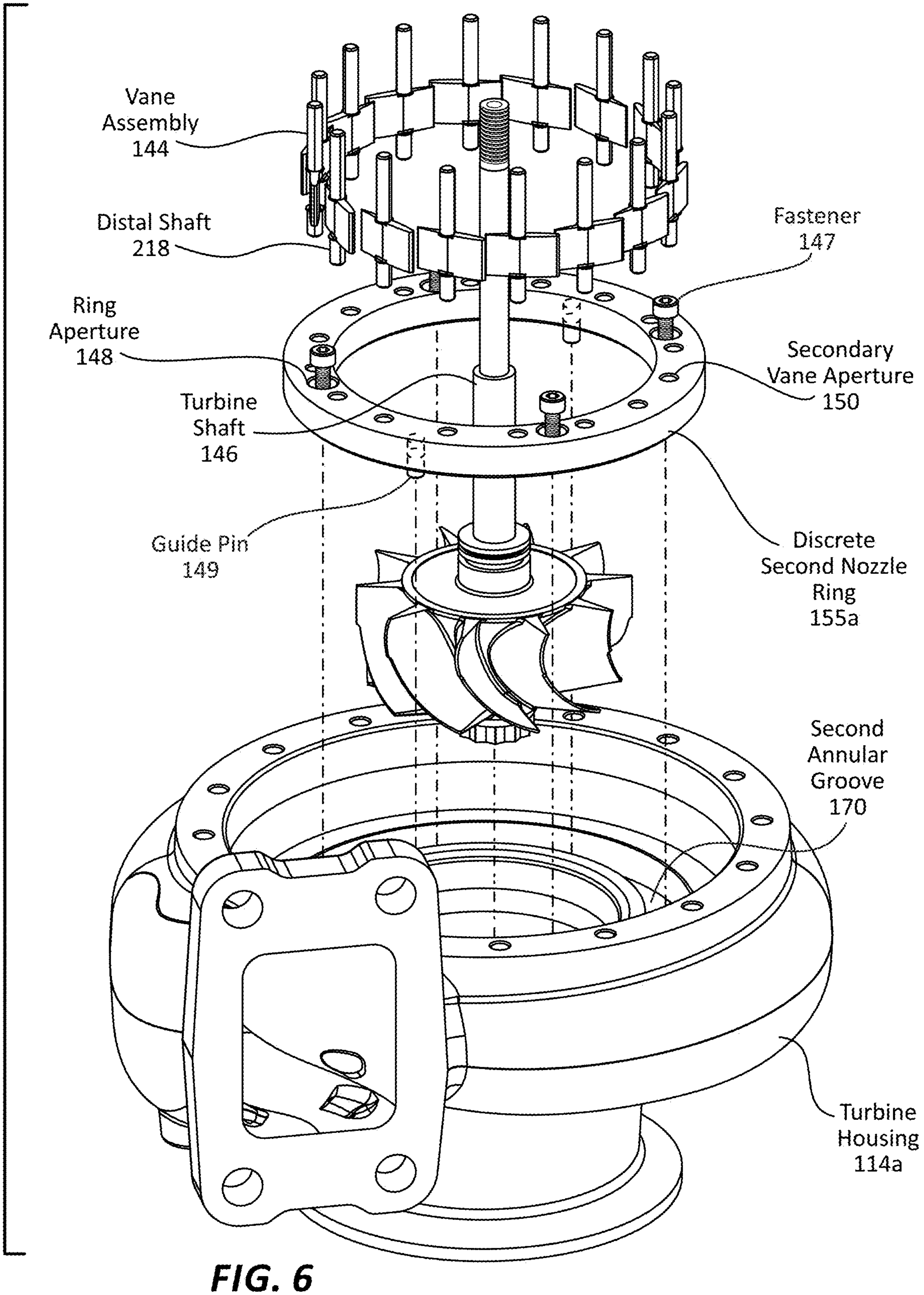
FIG. 6 illustrates a portion of a turbocharger having a discrete second nozzle ring.

In one alternative embodiment, a discrete second nozzle ring 155*a* is separate and distinct from a turbine housing 114*a* (illustrated in FIG. 6). The discrete second nozzle ring 155*a* may be formed of different materials than that of the turbine housing 114*a*, which may allow for greater flexibility. Additionally, or alternatively, the metal from which discrete second nozzle ring 155*a* is made may be hardened to increase the durability and lifespan of the turbocharger 100.

When assembled, the proximal shaft 216 of each vane assembly 144 is rotatably disposed in one of the vane apertures 140 with the vane 210 disposed adjacent to the second side 203. A remote end of the proximal shaft 216 extends through the inner annular nozzle ring surface 208 of the first nozzle ring 118. A remote end of the distal shaft 218 of each vane assembly 144 is rotatably disposed in a secondary vane aperture 151 of the integrated second nozzle ring 155. Accordingly, each vane assembly 144 may pivot about the common longitudinal axis 213.

Accordingly, when the annular unison ring 136 rotates within the annular groove 168 (in response to movement of the actuator 116, linkage 250, and the unison crank 128), each of the unison pins 134 is moved, thereby causing the first end 133 of each vane arm 132 to pivot, thereby causing the second end 135 of each vane arm 132 to rotate about the common longitudinal axis 213 (illustrated in FIG. 5C) (by virtue of the fixed attachment between the second end 135 of the vane arm 132 and proximal shaft 216), thereby causing openings intermediate the vanes 210 to increase or decrease in size and thus regulating the flow, speed, and angle of exhaust (received via the exhaust inlet 120) to the turbine wheel 154. The regulation of the flow of exhaust into the turbine wheel 154 regulates the rotation of the compressor wheel 124, which affects the amount of air injected into an engine in fluid communication with the air outlet 111. The set of ball bearings 225 disposed within the bearing race 157 may reduce the friction resulting from the rotation of the annular unison ring 136. This reduction may improve the efficiency of the processes described above and, in addition, may extend the life of the various parts and the turbocharger 100.

When a turbocharger 100 or turbocharger component (e.g., a subset of the components of the turbocharger 100) is in an operational mode (i.e., operating in response to an engine or assembled to perform the specified operations whether inside or outside of a vehicle), the annular unison ring 136 rotationally engages the first nozzle ring 118 via the set of ball bearings 225. In the illustrated embodiment, the annular unison ring 136 is devoid of direct contact with the first nozzle ring 118 (i.e., only contacts the first nozzle ring 118 through the set of ball bearings 225). As illustrated in FIG. 4B, there may be gaps 209, 211, 215, 217 along the length dimension 180 and the width dimension 182 between the annular unison ring 136 and surrounding components, including the first nozzle ring 118 and the cover plate 113. This arrangement reduces the wear and tear on the turbocharger, heat generated by friction, and results in a significant improvement in the operation of the turbocharger 100 (e.g., improved responsiveness), enabling the turbocharger 100 to provide significantly increased efficiency when installed in an associated vehicle (not illustrated).

The outer insertion recess 139 and inner insertion recess 137 when rotationally aligned, define a ball bearing insertion recess 176 through which a ball bearing of the set of ball bearings 225 may be inserted into the bearing race 157, as will be discussed subsequently.

Additionally, the vane assemblies 144 may also be positioned in a closed or nearly closed rotational position (as illustrated and discussed subsequently) such that exhaust flow is restricted thereby causing high pressure at the exhaust inlet 120 which then causes a feature in the coupled engine called "exhaust braking" or "compression braking."

The rotation of the turbine wheel 154 causes the turbine shaft 146 to also rotate, which, when the turbine shaft 146 is secured to the compressor wheel 124 using the shaft nut 122, also causes the compressor wheel 124 to rotate. The rotation of the compressor wheel 124 will cause air from the air inlet 125 to be pushed through the compressor housing 110 and through the air outlet 111.

As indicated previously, the turbine housing 114 may comprise the exhaust inlet 120 through which incoming exhaust from an engine may pass and the exhaust outlet 123 through which exhaust may exit the turbine housing 114.

As illustrated, the unison crank 128 may comprise the forked member 193. The forked member 193 may engage with the eccentric pin 192 of the annular unison ring 136. The unison crank 128 may comprise the rotational pin recess 199 for receiving the rotational pin 248. The actuating arm 253 may engage with the unison crank 128. The actuating arm 253 may comprise the actuating arm connector 255 for engaging with the linkage 250 and the actuating shaft 252. The foregoing components enable translation of linear movement of the actuating shaft 252 into rotational movement of the annular unison ring 136. Rotational movement of the annular unison ring 136, in turn, results in rotation of each vane 210 of the vane assembly 144.

FIG. 6

FIG. 6 comprises an exploded view of certain components of a turbocharger or turbocharger component. More specifically, FIG. 6 illustrates a plurality of vane assemblies 144, a turbine shaft 146, a discrete second nozzle ring 155*a* and a turbine housing 114*a*. The plurality of vane assemblies 144 and the turbine shaft 146 are identical to those shown in FIGS. 1-5A. The discrete second nozzle ring 155*a* and turbine housing 114*a* shown in FIG. 6, taken together, perform a function similar to the turbine housing 114, shown in FIGS. 1-5A. Thus, the discrete second nozzle ring 155*a* and the turbine housing 114*a* may operate in connection with components illustrated in FIGS. 1-5A.

In this embodiment, fasteners 147 and ring apertures 148 are utilized to secure the discrete second nozzle ring 155*a* within a second annular groove 170 of the turbine housing 114*a*. Guide pins 149 may be utilized for positioning of the discrete second nozzle ring 155*a* within the second annular groove 170. The discrete second nozzle ring 155*a* may be positioned at different rotational orientations with respect to the turbine housing 114*a*, thus enabling the turbocharger component to be positioned in engine spaces of different designs (i.e., allowing the actuator 116 and actuating arm 253 be positioned at different rotational orientations relative to the turbine housing 114*a*.) A distal shaft 218 of each vane assembly 144 may be positioned within a secondary vane aperture 151 of the discrete second nozzle ring 155*a*.

It should be noted that, in certain embodiments, the fasteners 147 and/or guide pins 149 are omitted such that the discrete second annular nozzle ring 155*a* is rotatable, during assembly, within the second annular groove 170. In such embodiments, after assembly, the discrete second nozzle ring 155*a* may be retained within the annular groove 170 by virtue of engagement with the vane assemblies 144, which will also limit rotation of the second annular nozzle ring 155*a* within the second annular groove 170.

FIGS. 7A-9P

Figure 7A:
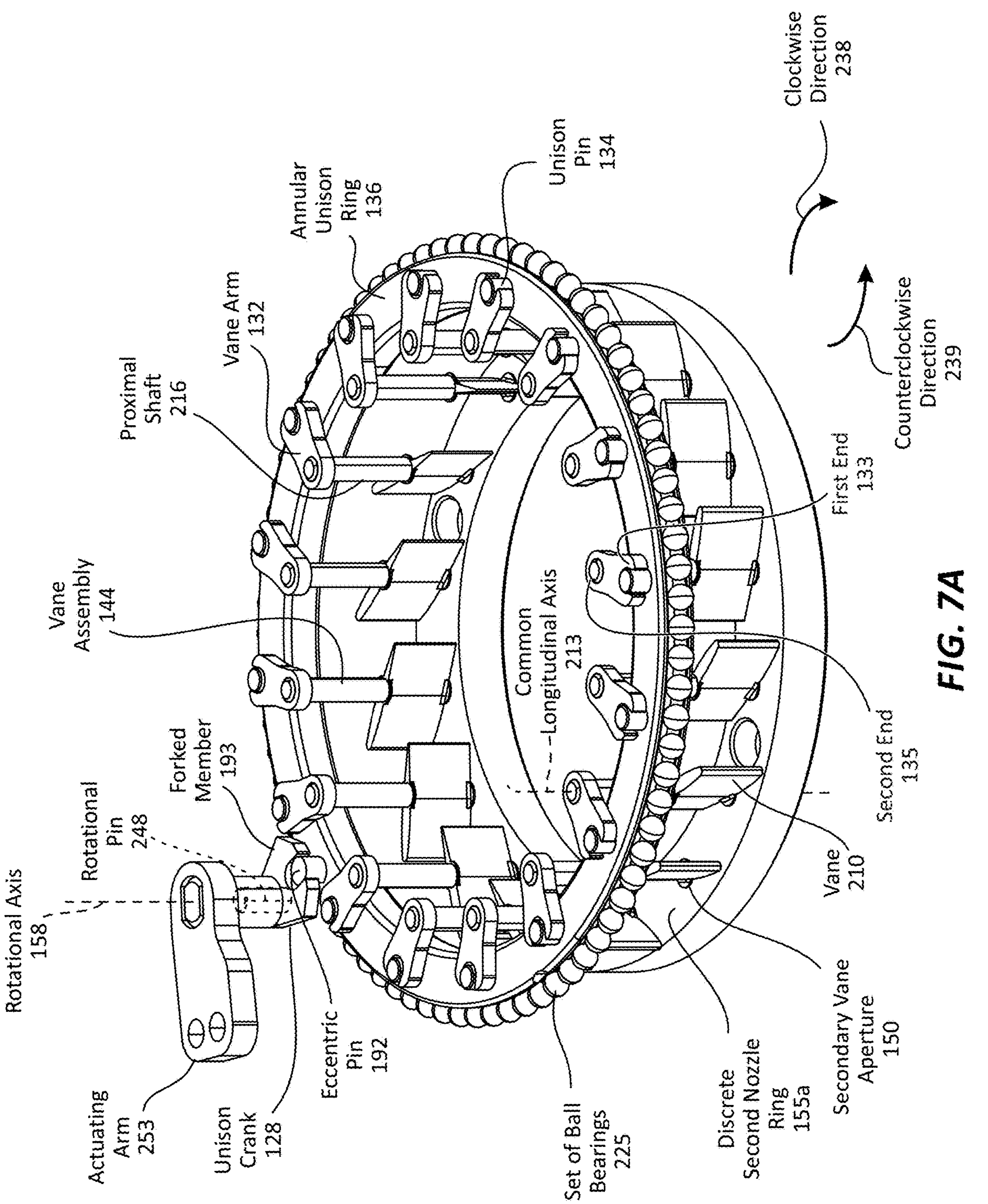
FIG. 7A is a perspective view of one embodiment of a combination of an actuating arm, an annular unison ring, a discrete second nozzle ring, and a unison crank with a plurality of unison pins, vane arms, and vane assemblies in an assembled state with the vane assemblies in one possible partially open position.
Figure 7B:
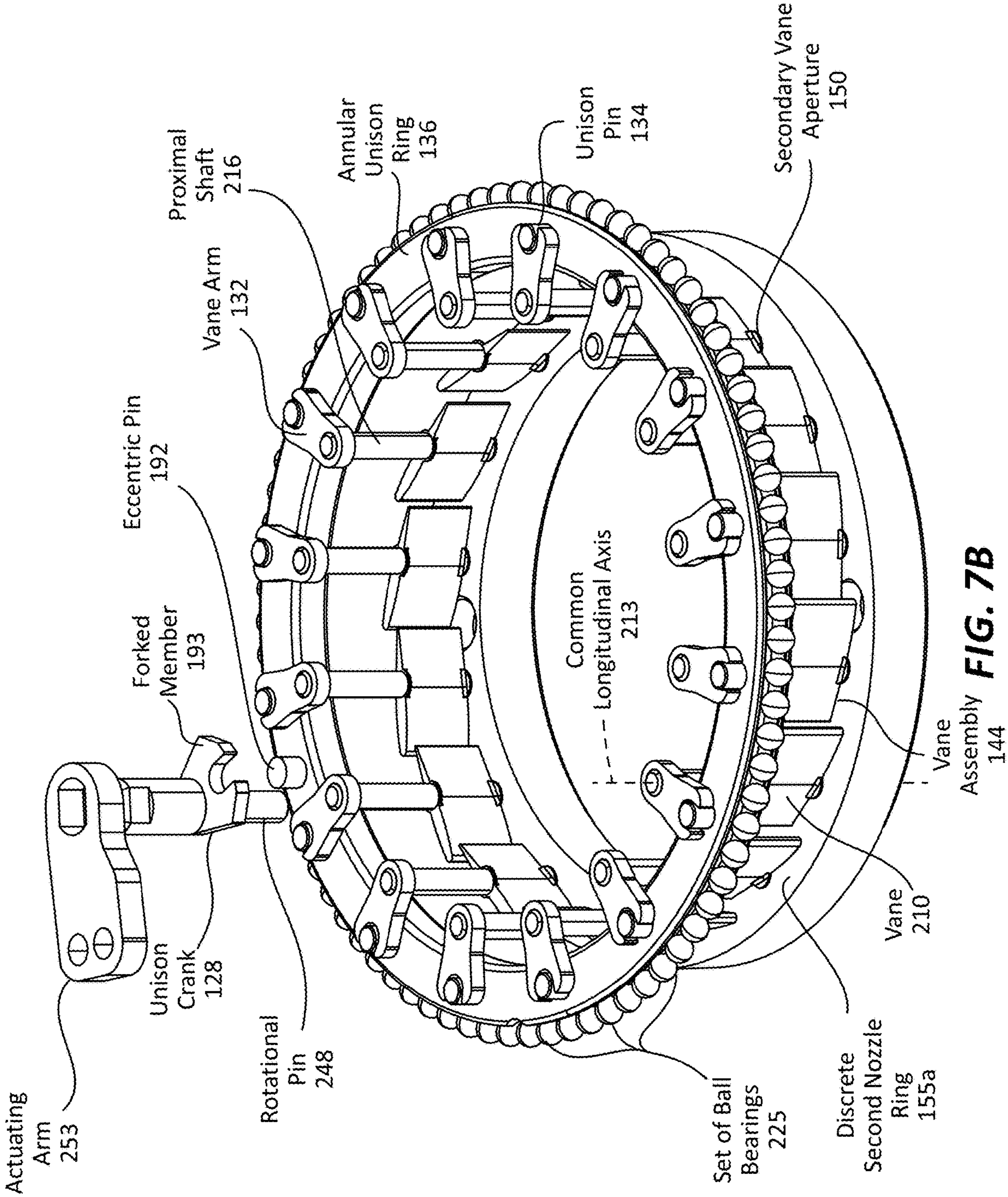
FIG. 7B is a perspective view of one embodiment of the components illustrated in FIG. 7A with the vane assemblies in a closed position.
Figure 7C:
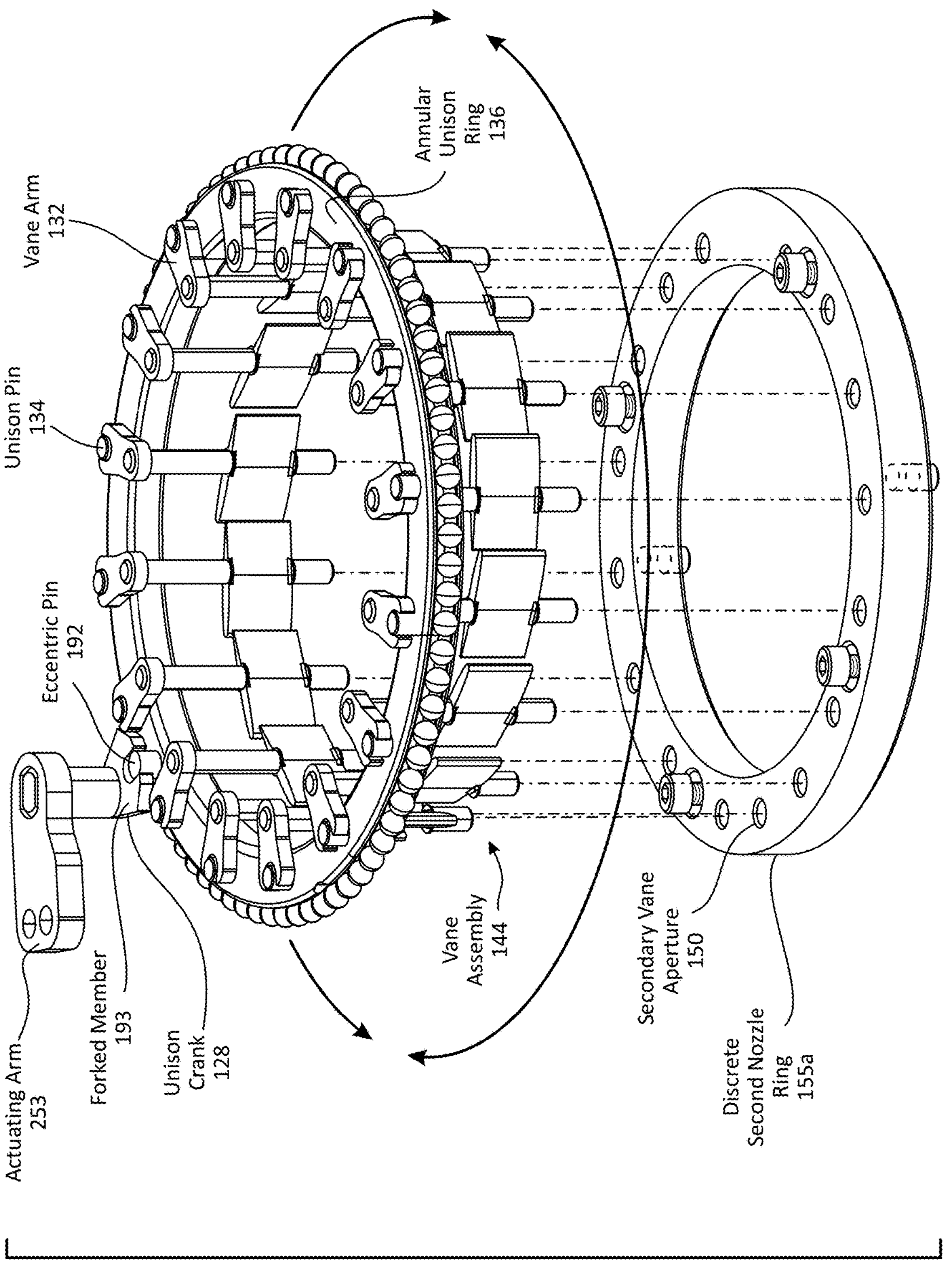
FIG. 7C is a partially exploded perspective view of the components illustrated in 7A with the vane assemblies in a closed position.
Figure 8:
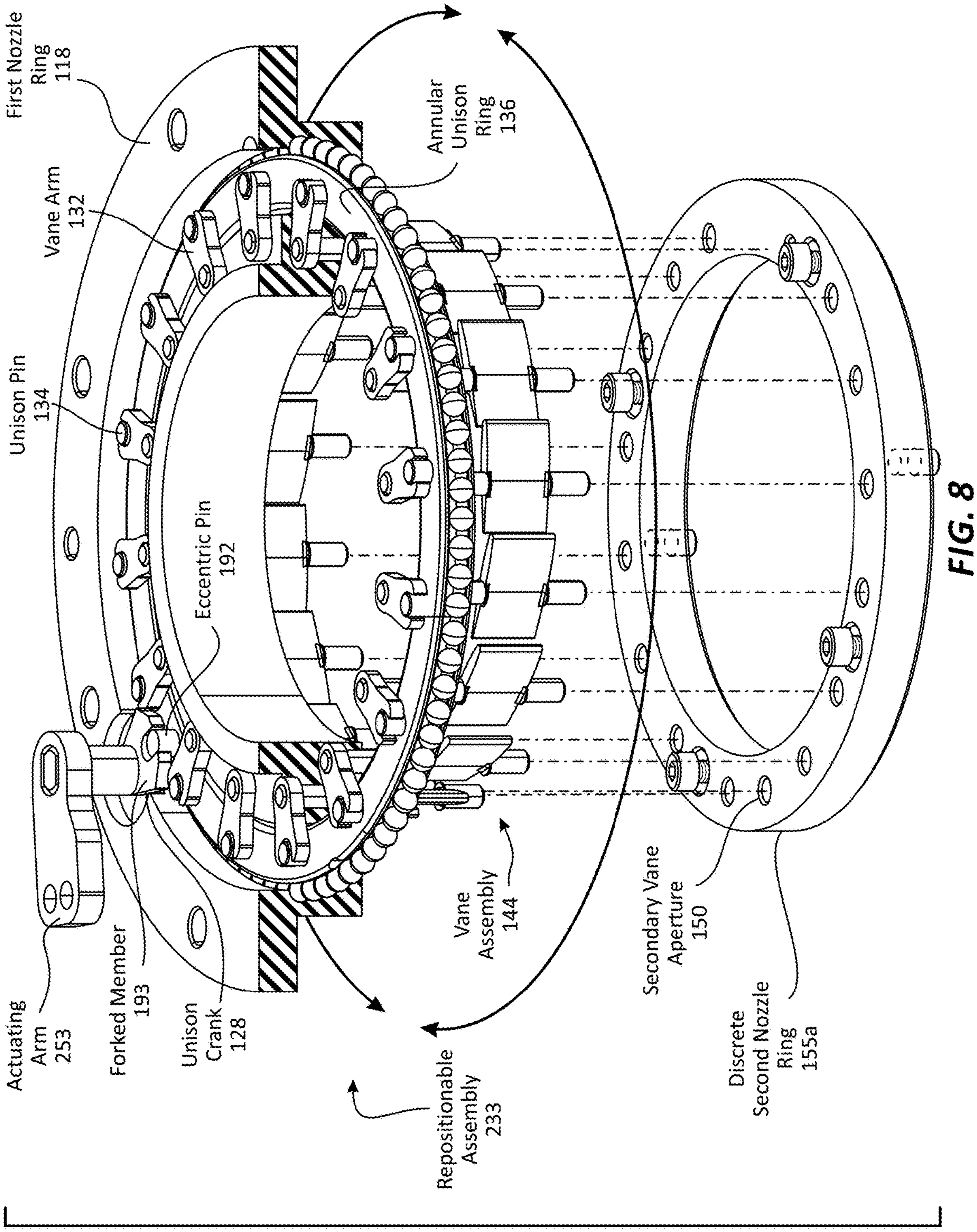
FIG. 8 is similar to FIG. 7C except that it also illustrates a partial cross-sectional view of the first nozzle ring.

FIGS. 7A-8 will be discussed concurrently and, as a consequence, the pertinent reference numbers and parts will be identified in one or more of these figures but not necessarily in all of the figures. FIG. 7A is a perspective view of one embodiment of an annular unison ring 136, a discrete second nozzle ring 155*a*, an actuating arm 253 (which may be coupled to an actuator 116), a unison crank 128 (which includes a forked member 193 engaged with an eccentric pin 192 of the annular unison ring 136), a rotational pin 248, a rotational axis 158 of the unison crank 128, a plurality of unison pins 134, vane arms 132, a set of ball bearings 225, and vane assemblies 144 in an assembled state with the vane assemblies 144 in one possible open position. FIG. 7B illustrates the same components but with the vane assemblies 144 in a closed position.

FIGS. 7A-7B will be discussed concurrently. As illustrated in these figures, in response to rotation of the unison crank 128, which is controlled by the actuator 116, the annular unison ring 136 rotates. The rotation of the annular unison ring 136, in turn, causes each of the vane arms 132 to pivot with respect to the common longitudinal axis 213 of each vane assembly 144 (i.e., to pivot with the distal shaft 218 at least partially disposed in a secondary vane aperture 150). More specifically, rotation of the annular unison ring 136 acts upon each vane arm 132 via each unison pin 134, thereby causing each vane assembly 144 to rotate. It should also be noted, although not illustrated in FIGS. 7A-7B, the proximal shaft 216 of each vane assembly 144 may rotate within a vane aperture 140 of the first nozzle ring 118. Because each of the vane arms 132 are fixedly coupled to one of the vane assemblies 144, the rotation of the vane arms 132 causes each vane assembly 144 and the vanes 210 to pivot with respect to each common longitudinal axis 213, which alters openings between the vanes 210. Consequently, openings between the vanes 210 may be altered to regulate the amount and angle of exhaust flowing into and striking the turbine wheel 154. Each vane assembly 144, including each vane 210, may pivot about a common longitudinal axis 213 in response to actuation of the actuator 116 causing rotation of the unison crank 128 about the rotational axis 158, which causes the annular unison ring 136 to rotate.

When engaged with the unison crank 128, the annular unison ring 136 (i.e., when a turbocharger (e.g., turbocharger 100) or turbocharger component is in an operational mode) has a limited range of motion in a clockwise direction 238 or a counterclockwise direction 239 (i.e., because the forked member 193 will travel only a relatively short distance in response to rotation of the unison crank 128 about the about the rotational axis 158) such that the inner insertion recess 137 and the outer insertion recess 139 will not be rotationally aligned (aligned as a result of rotation of the annular unison ring 136 relative to the first nozzle ring 118) in the operational mode.

Figure 9A:
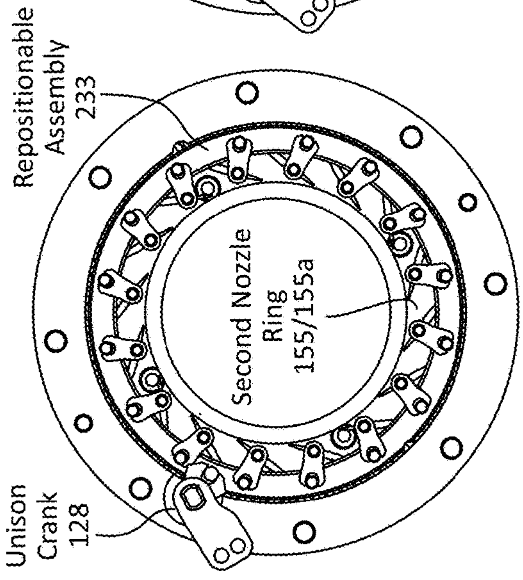
FIGS. 9A-9P illustrate various embodiments of rotatable assembly at different rotational orientations with respect to the discrete second nozzle ring.
Figure 9B:
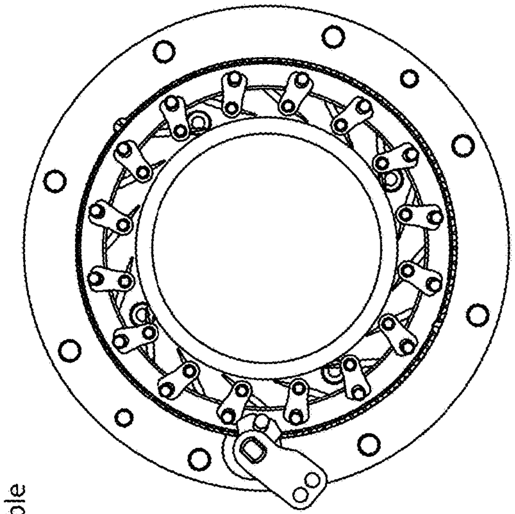
Figure 9C:
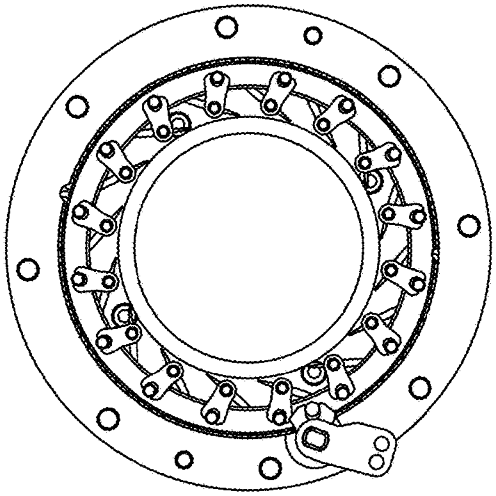
Figure 9D:
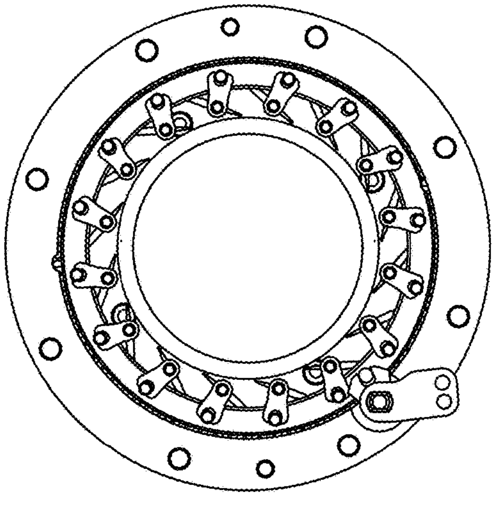
Figure 9E:
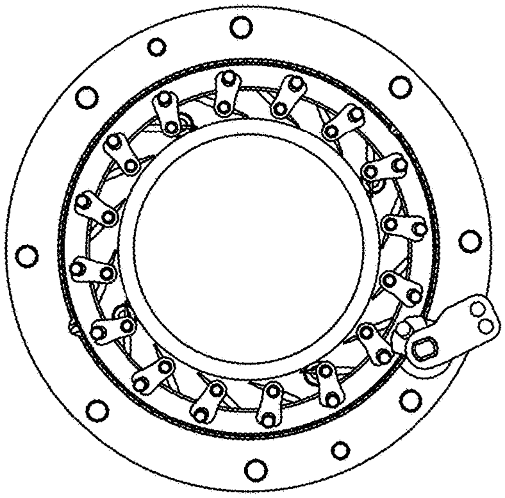
Figure 9F:
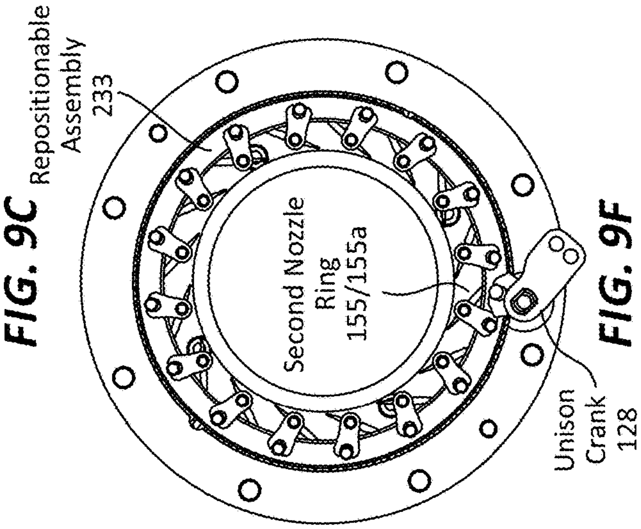
Figure 9G:
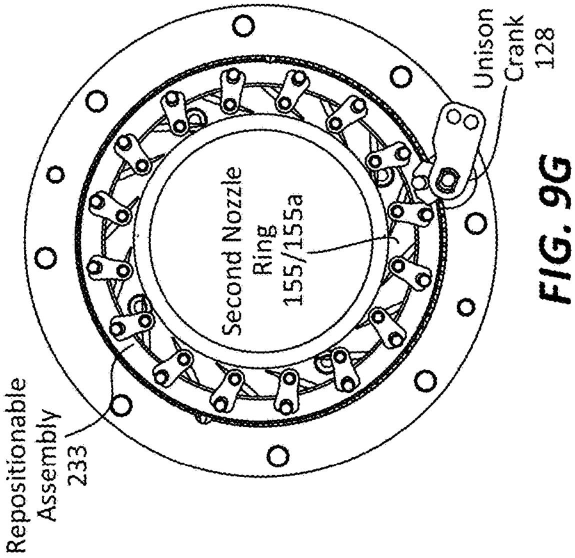
Figure 9H:
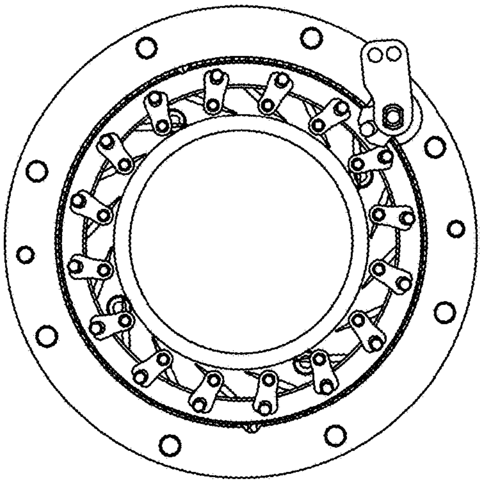
Figure 9I:
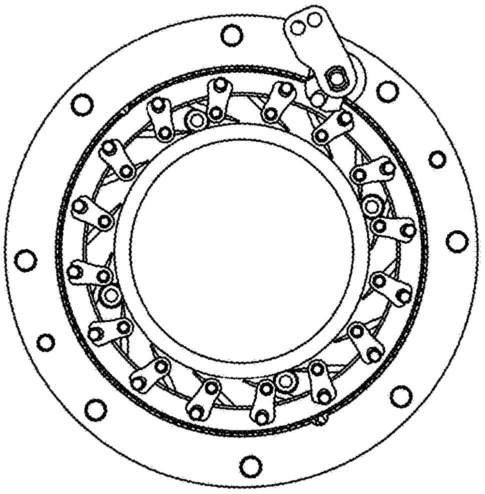
Figure 9J:
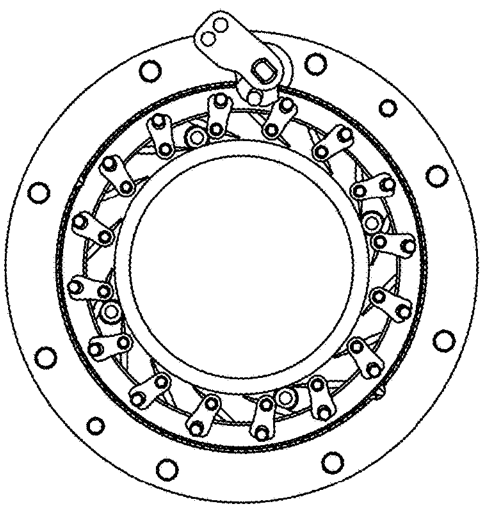
Figure 9K:
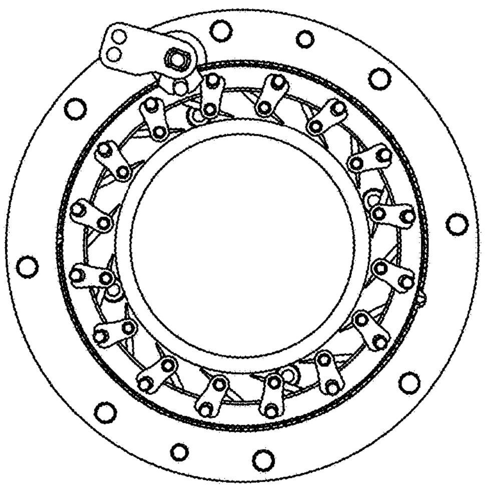
Figure 9L:
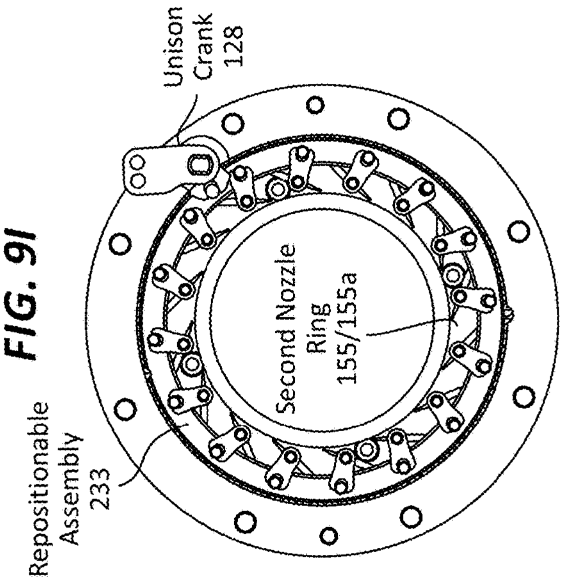
Figure 9O:
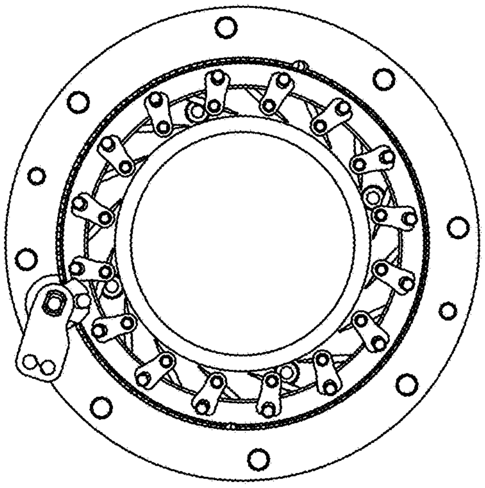
Figure 9N:
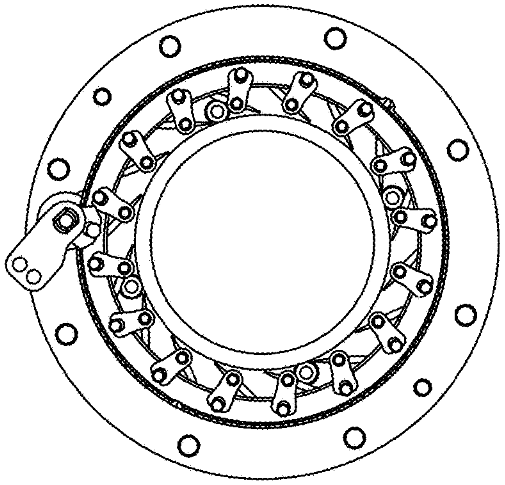
Figure 9M:
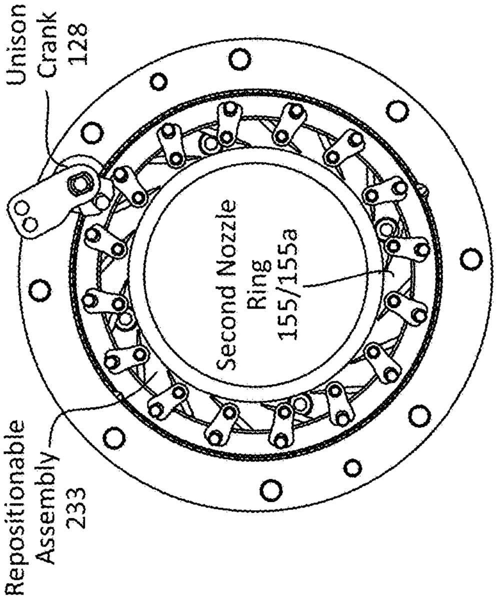
Figure 9P:
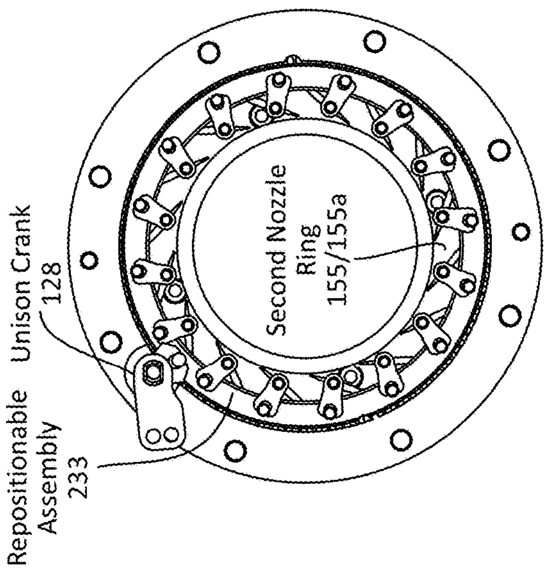

FIG. 7C is similar to FIG. 7B except that certain components are more clearly illustrated as they are shown in a partially exploded view. FIG. 8 is similar to FIG. 7C except that a partial cross-sectional view of the first nozzle ring 118 has been added to FIG. 8. The repositionable assembly 233, shown in FIG. 8, comprises the vane assemblies 144, the annular unison ring 136 comprising unison pins 134 and an eccentric pin 192, vane arms 132, the unison crank 128 comprising the forked member 193, the actuating arm 253 and the first nozzle ring 118. The repositionable assembly 233 may be repositioned at different rotational orientations with respect to the discrete second nozzle ring 155*a* (as illustrated) or the integrated second nozzle ring 155 (previously illustrated). Various different positions of the repositionable assembly 233 (including the unison crank 128) relative to the second nozzle ring 155/155*a* are illustrated in FIGS. 9A-9P. It should be noted that FIGS. 9A-9P do not exhaustively illustrate all potential positions of the repositionable assembly 233. For example, the repositionable assembly 233 in the second nozzle ring 155/155*a* could be configured in different ways to vary the number of potential repositioning options and angular orientation of each repositioning option of the repositionable assembly 233.

As illustrated in FIGS. 7A-8, the unison crank 128 pivots with respect to the first nozzle ring 118 with the forked member 193 engaged with the eccentric pin 192. Pivoting of the unison crank 128 causes the annular unison ring 136 to rotate, which, in turn, triggers rotation of each vane assembly 144 via interaction between the unison pins 134 of the annular unison ring 136 and the vane arms 132.

FIGS. 10A-10B

Figure 10A:
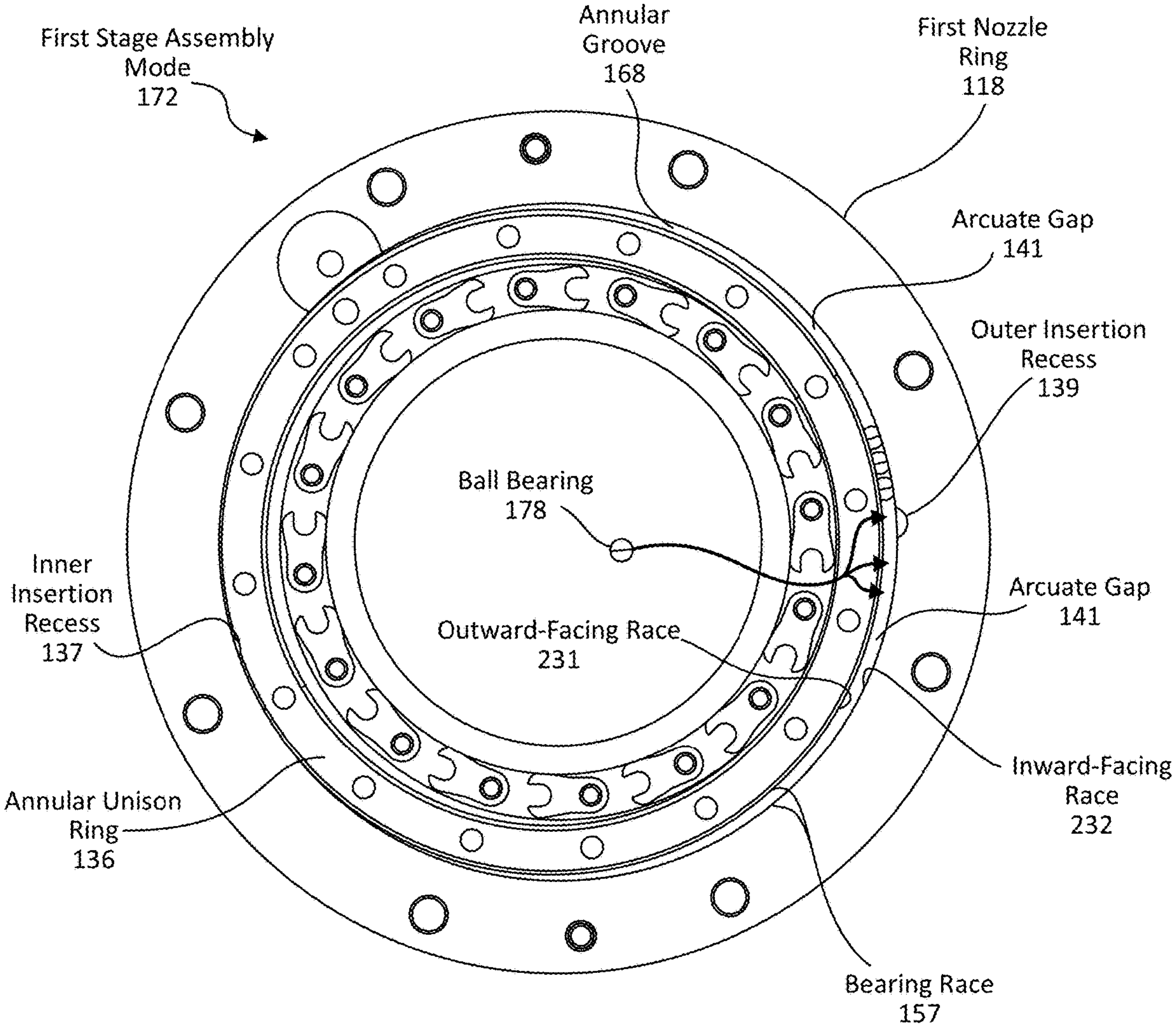
Figure 10B:
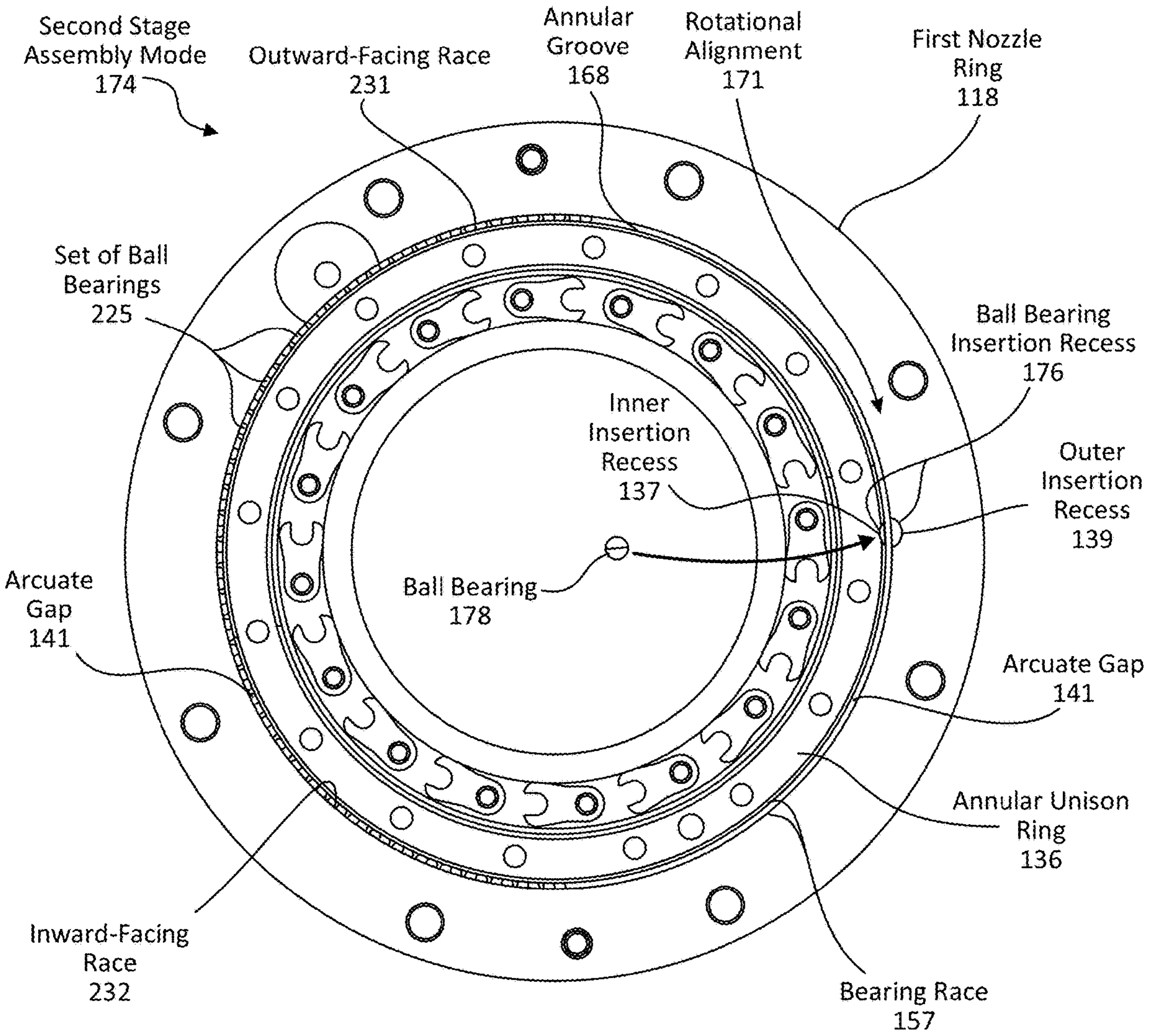
FIG. 10B is a top, perspective view of the first nozzle ring in annular unison ring shown with additional ball bearings inserted into the bearing race.

FIGS. 10A-10B illustrate a first stage assembly mode 172 and a second stage assembly mode 174. FIGS. 10A-10B will be discussed concurrently and, as a consequence, the pertinent reference numbers and parts will be identified in one or more of these figures but not necessarily in all of the figures.

FIGS. 10A-10B provide a top view of the first nozzle ring 118, the annular unison ring 136, the outward-facing race 231, the inner insertion recess 137 (which may comprise an arcuate recess), outer insertion recess 139 (which may also comprise an arcuate recess). In the first stage assembly mode 172 illustrated in FIG. 10A, the arcuate gap 141 is sufficiently large to allow insertion of ball bearings 178 into the bearing race 157, which is defined by the inward-facing race 232 and the outward-facing race 231. Because so few ball bearings 178 have been inserted into the bearing race 157, the annular unison ring 136, may be shifted to one side of the annular groove 168, thereby creating a larger opening on the opposite side of the annular groove 168 such that ball bearings 178 may be inserted directly between the outward-facing race 231 and the inward-facing race 232 without formation of a ball bearing insertion recess 176 as result of rotational alignment 171 of the inner insertion recess 137 and the outer insertion recess 139. In the first stage assembly mode 172, the arcuate gap 141 is sufficiently large to enable insertion of a ball bearing 178 of the set of ball bearings 225 (labeled in previous figures) into the bearing race 157 regardless of whether the inner insertion recess 137 is rotationally aligned with the outer insertion recess 139 forming the ball bearing insertion recess 176 (illustrated in FIG. 10B).

Referring to FIG. 10B, a second stage assembly mode 174 is illustrated. In the second stage assembly mode 174, no portion of the arcuate gap 141 is sufficiently large to enable insertion of a ball bearing 178 of the set of ball bearings 225 into the bearing race 157 except through the ball bearing insertion recess 176 formed by rotational alignment 171 of the inner insertion recess 137 and the outer insertion recess 139. The arcuate gap 141 decreases in size as a sufficient number of ball bearings 178 are inserted into the bearing race 157 to constrain movement of the annular unison ring 136 within the annular groove 168 (illustrated in FIG. 5B) such that the arcuate gap 141 is narrower than a diameter of a ball bearing 178. The number of ball bearings 178 may vary, for example, based on the size (i.e., diameter) of the ball bearings 178, the arcuate gap 141, and the depth of the outward-facing race 231 and the inward-facing race 232. For example, in various embodiments, the sufficient number of ball bearings 178 may involve the number of ball bearings 178 completely filling more than one-half or one-third of the bearing race 157 with ball bearings 178.

When the turbocharger or turbocharger component is in an operational mode, the inner insertion recess 137 is not rotationally aligned with the outer insertion recess 139 such that the set of ball bearings 225 are retained within the bearing race 157. This non-aligned condition is maintained in the operational mode because the unison crank 128 constrains the degree of rotation of the annular unison ring 136 within the annular groove 168 such that rotational alignment 171 of the inner insertion recess 137 and the outer insertion recess 139 is not possible.

FIGS. 11A-11B

Figure 11A:
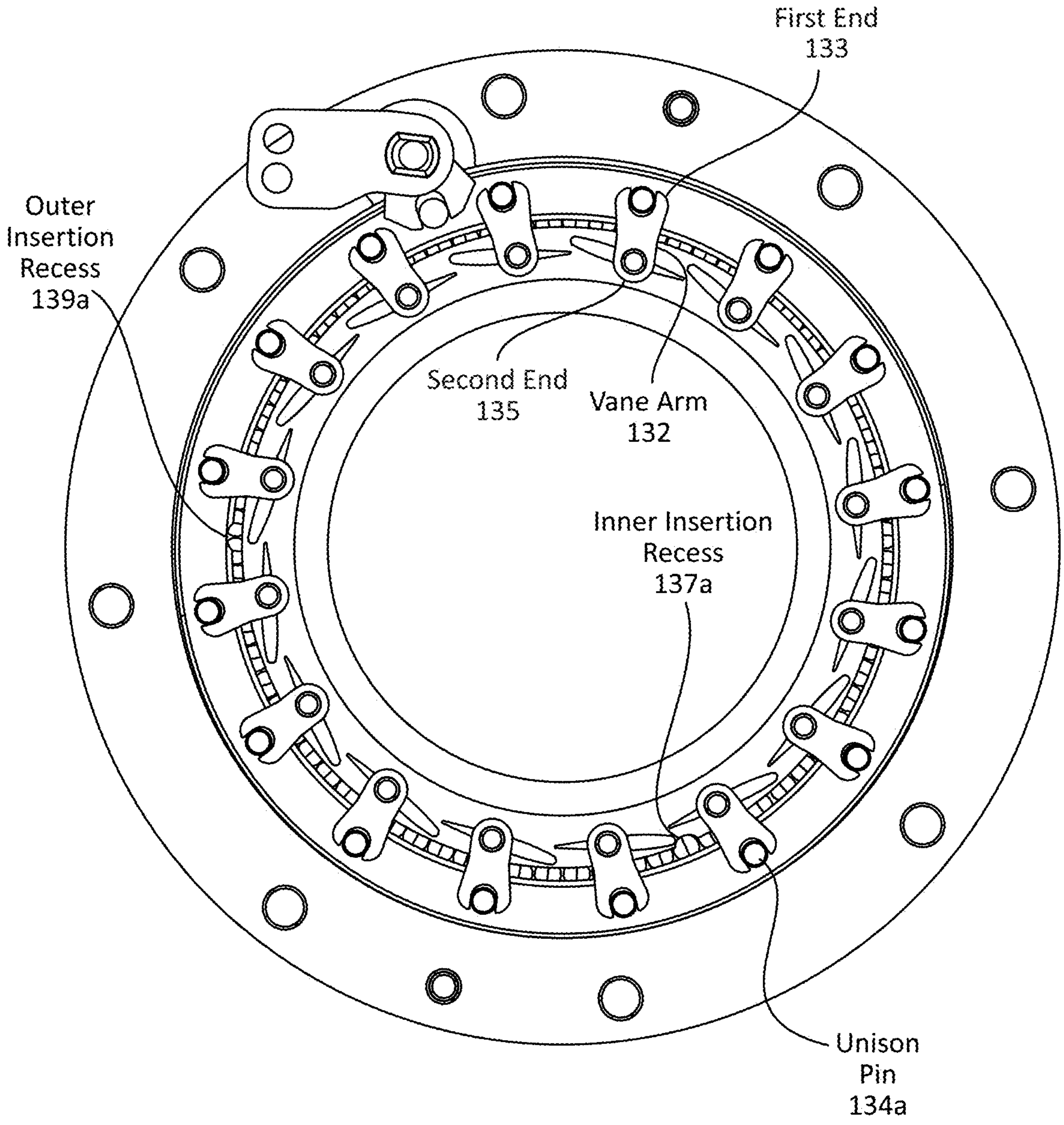
FIG. 11A is a top, perspective view of a portion of a turbocharger having a set of ball bearings disposed inwardly of an annular unison ring.
Figure 11B:
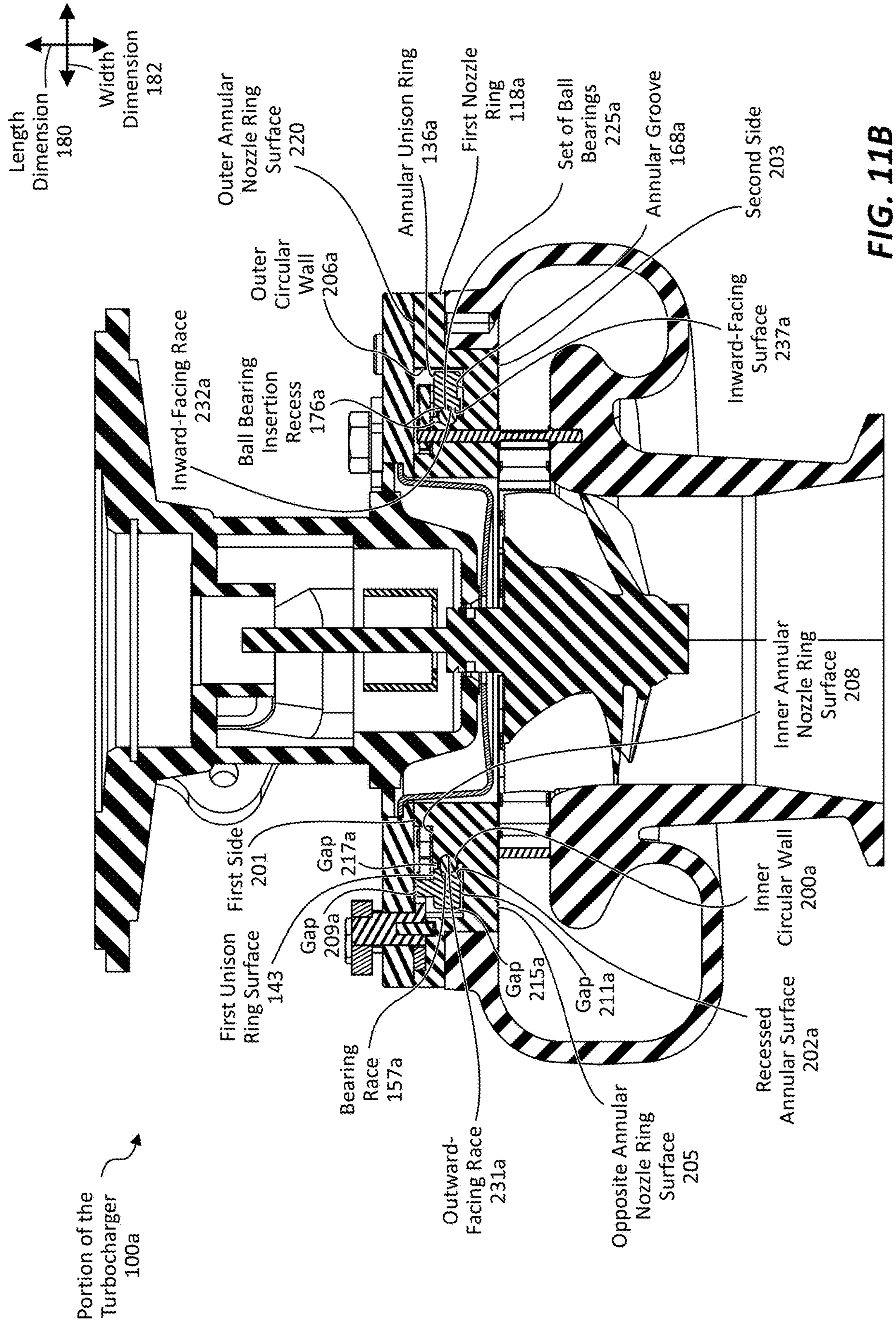
FIG. 11B is a side, cross-sectional view of a portion of a turbocharger having a set of ball bearings disposed inwardly of the annular unison ring.

FIGS. 11A-11B illustrate an alternative embodiment of a turbocharger or turbocharger component (e.g., portion of the turbocharger 100*a*). The embodiment illustrated in FIGS. 11A-11B is different from previously disclosed embodiments primarily in that the set of ball bearings 255*a* is disposed inward of the annular unison ring 136*a*. It should also be noted that variations of the subject matter disclosed herein could be incorporated into the embodiment illustrated in FIGS. 11A-11B, and the embodiment illustrated in FIGS. 11A-11B could include, for example, an integrated or discrete second nozzle ring. In the illustrated embodiment, the annular unison ring 136*a* may be devoid of direct contact with the first nozzle ring 118*a* such that it only indirectly contacts the first nozzle ring 118*a* via the set of ball bearings 255*a*, thus reducing friction and enhancing the performance and durability of the disclosed turbocharger or turbocharger component. Accordingly, there are gaps 209*a*, 211*a*, 215*a*, 217*a* along the length dimension 180 and the width dimension 182 about the annular unison ring 136*a*.

As illustrated in FIGS. 11A-11B, the first nozzle ring 118*a* includes a first side 201 and a second side 203, disposed on opposite sides of the first nozzle ring 118*a* along the length dimension 180. The first nozzle ring 118*a* also includes an outer annular nozzle ring surface 220.

The annular groove 168*a* also includes an inner circular wall 200*a*, an outer circular wall 206*a*, and a recessed annular surface 202*a*. A plurality of unison pins 134*a* extend from a first unison ring surface 143 of the annular unison ring 136*a*. Each unison pin 134*a* may be pivotally coupled to a first end 133 of a vane arm 132. A second end 135 of each vane arm 132 may also be fixedly coupled to a corresponding vane assembly 144 (labeled in prior figures).

As illustrated in FIGS. 11A-11B, an inward-facing surface 237*a* of the annular unison ring 136*a* comprises an inward-facing race 232*a* and an inner circular wall 200*a* of the annular groove 168*a* comprises an outward-facing race 231*a*. Together the inward-facing race 232*a* and the outward-facing race 231*a* form a bearing race 157*a*. A set of ball bearings 255*a* is disposed within a bearing race 157*a* defined by the inward-facing race 232*a* and the outward-facing race 231*a*.

A ball bearing insertion recess 176*a* is formed when an inner insertion recess 137*a* is rotationally aligned with an outer insertion recess 139*a*. Thus, these features operate in a similar manner as described in FIGS. 10A-10B in connection with a first stage assembly mode 172 and a second stage assembly mode 174.

As indicated in FIG. 11B, the turbocharger or turbocharger component comprises a length dimension 180 and a width dimension 182.

It should be noted that the turbocharger or turbocharger component may interact with an actuator 116 (and related components) in the same or a similar manner as in connection with other embodiments.

It should also be noted that, in order to avoid overcrowding of the drawings with reference numerals and lead lines, not all of the components of the turbocharger or turbocharger component illustrated in FIGS. 11A-11B are labeled with reference numerals. For example, the compressor housing, air inlet, air outlet, fasteners, cover plates, cartridge housing, heatshield, the vane assemblies, and turbine housing are presented in FIGS. 11A-11B but are not labeled by reference numerals for the purpose of avoiding overcrowding of the drawings and focusing on differences between the embodiment illustrated in FIGS. 11A-11B and other disclosed embodiments. By this reference, these reference numerals and lead lines are incorporated into FIGS. 11A-11B.

FIGS. 12A-13

Figure 12B:
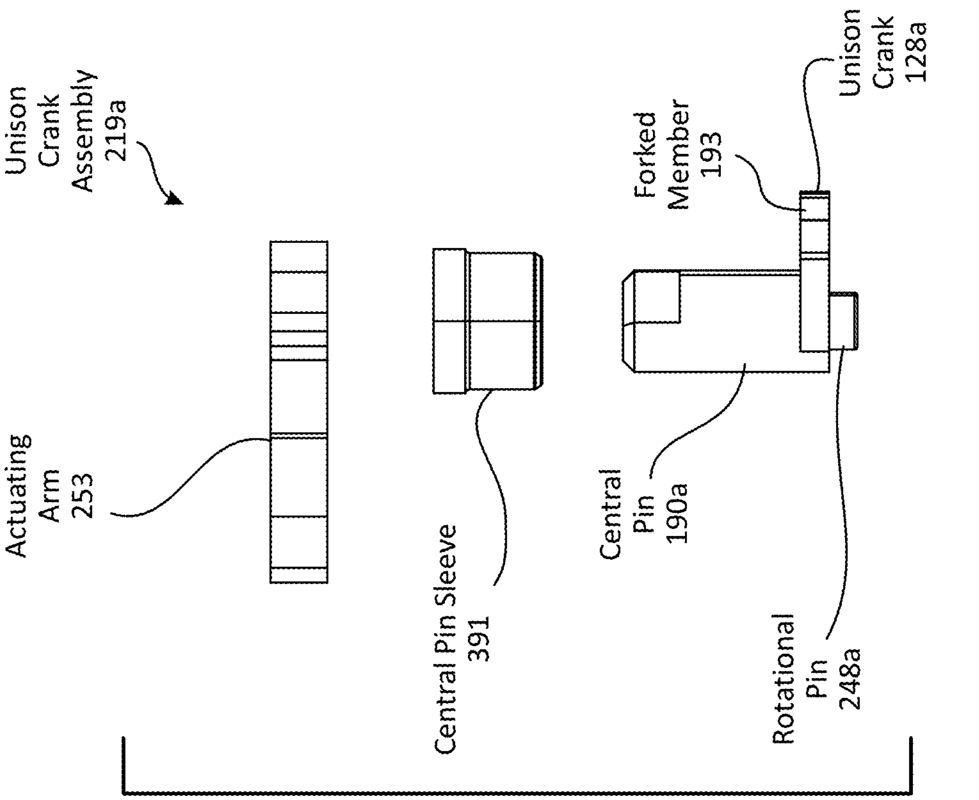
FIG. 12B is a side, exploded view of one embodiment of the unison crank assembly including a forked member and an integrated rotational pin.
Figure 12A:
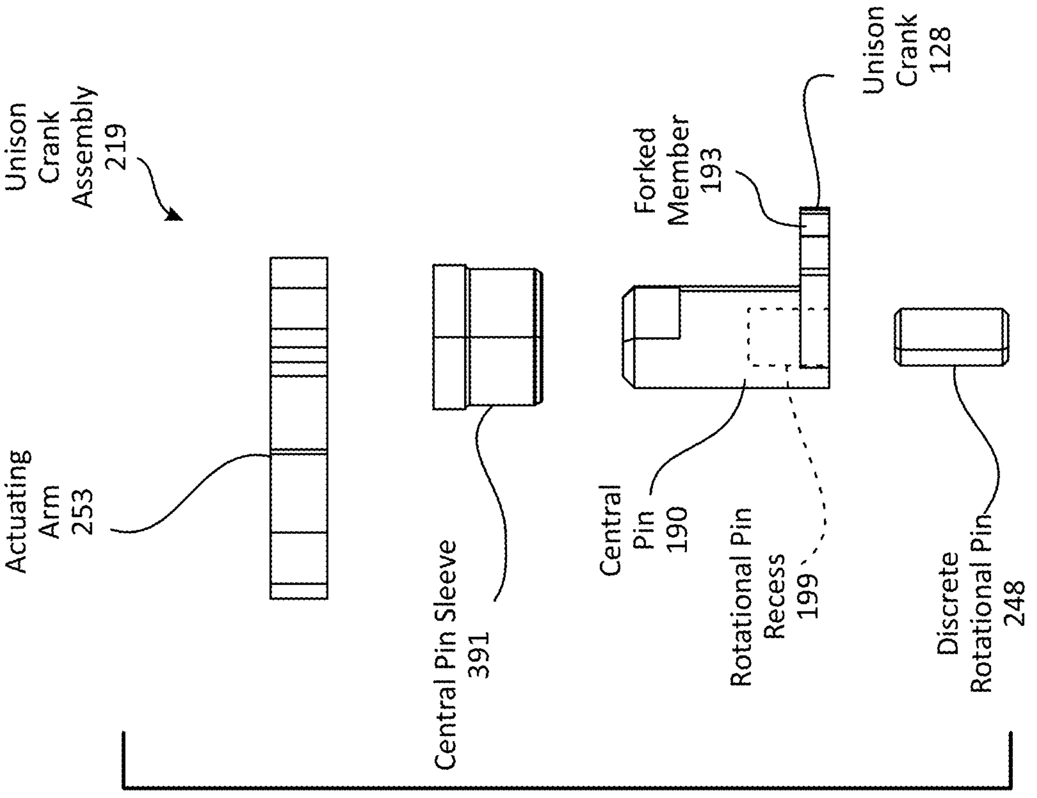
FIG. 12A is a side exploded view of one embodiment of a unison crank assembly including a forked member and a discrete rotational pin.

FIGS. 12A-12B illustrate various embodiments of unison crank assemblies 219, 219*a*, 219*b*, 219*c*. The unison crank assemblies 219, 219*a*, 219*b*, 219*c* are utilized to receive the linear motion (or generally linear motion) of an actuator 116 and trigger rotational movement of the annular unison ring 136, 136*a*.

The unison crank assembly 219 of FIG. 12A, includes an actuating arm 253, a central pin sleeve 391, and a unison crank 128 having a central pin 190 and a forked member 193 and a rotational pin recess 199 were partially receiving a discrete rotational pin 248. As illustrated, the central pin 190 and forked member 193 may be integrally formed, for example, utilizing a forging process or a machining process of unitary item. (Alternatively, components of the unison crank 128 may be separately formed and secured together using, for example, welding techniques.) The central pin sleeve 391 may be disposed about the central pin 190. As noted previously, the forked member 193 may engage with an eccentric pin 192 of the annular unison ring 136.

The unison crank assembly 219*a* of FIG. 12B includes an actuating arm 253, a central pin sleeve 391, and a unison crank 128*a* comprising a central pin 190*a*, a forked member 193 and a rotational pin 248*a*. As indicated in the figures, the central pin 190*a*, forked member 193, and rotational pin 248*a* may be integrally formed. Alternatively, one or more of the components of the unison crank 128*a* may be separately formed and joined together using, for example, welding or adhesives.

Figure 12C:
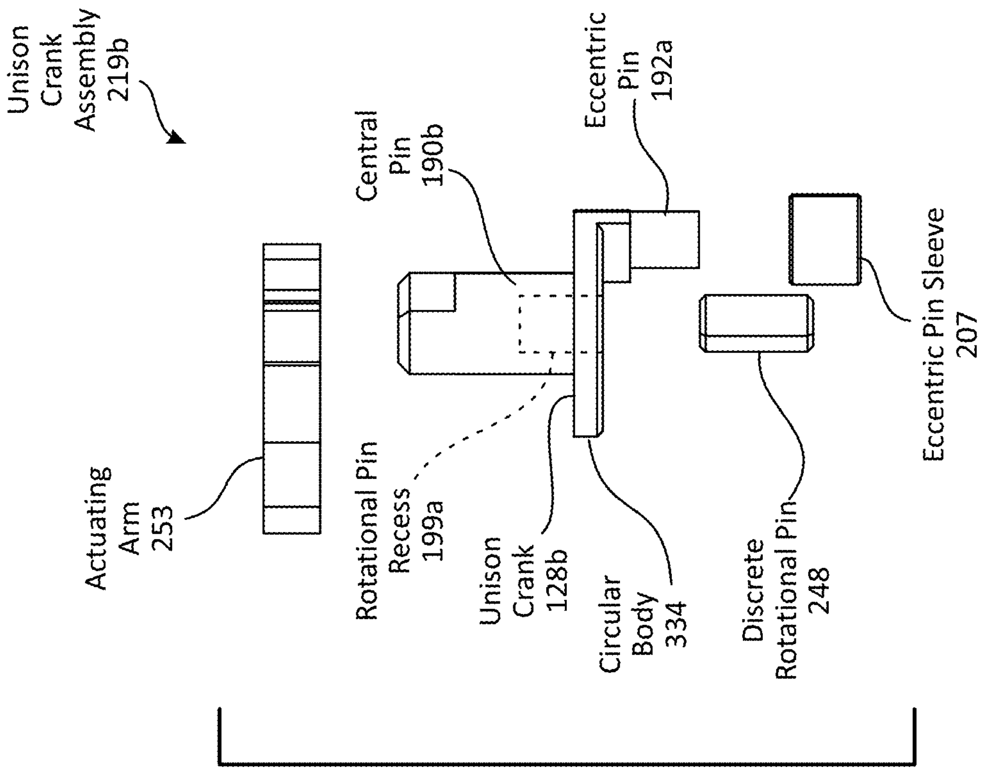
FIG. 12C is a side, exploded view of one embodiment of a unison crank assembly having an integrated eccentric pin and a discrete rotational pin.

The unison crank assembly 219*b* of FIG. 12C includes an actuating arm 253 with a unison crank 128*b* comprising a circular body 334, a central pin 190*b*, and an eccentric pin 192*a*. A rotational pin recess 199*a*, which may be cylindrical in shape, may partially receive the discrete rotational pin 248. An eccentric pin sleeve 207 may be disposed around the eccentric pin 192*a* to mitigate friction and wear and tear on the eccentric pin 192*a*. As indicated, the central pin 190*b*, circular body 334, and eccentric pin 192*a* may be integrally formed or separately formed and joined together.

Figure 12D:
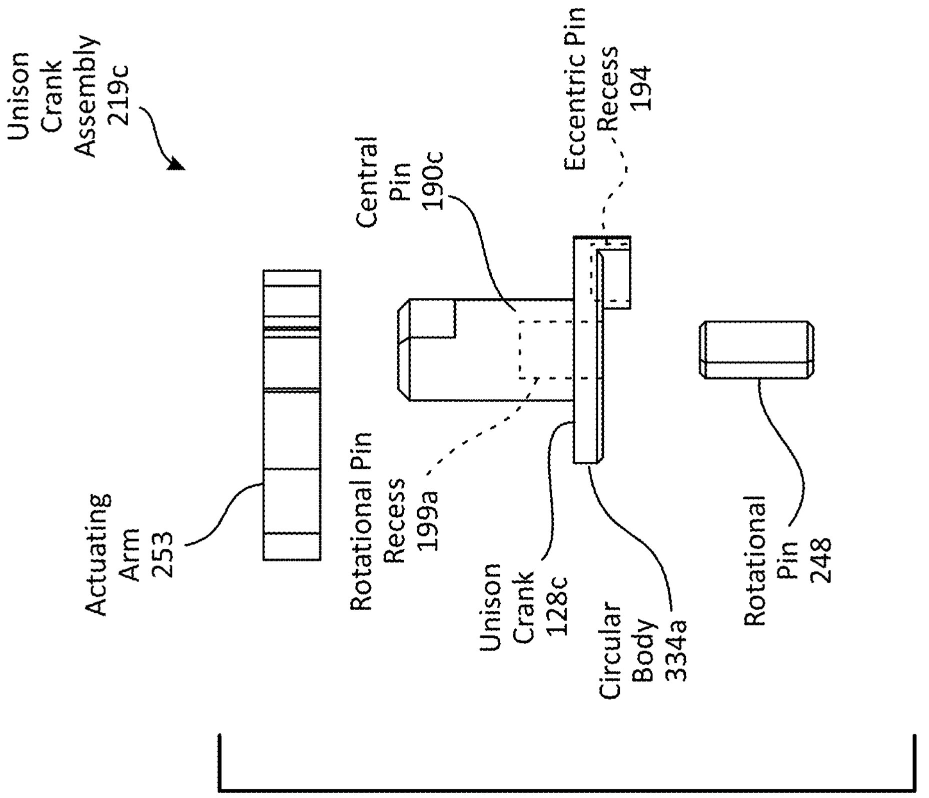
FIG. 12D is a side, exploded view of one embodiment of the unison crank assembly having a discrete rotational pin and an eccentric pin recess.

The unison crank assembly 219*c* illustrated in FIG. 12D may include an actuating arm 253, and a unison crank 128*c* comprising a central pin 190c and a circular body 334a. A rotational pin recess 199a disposed within the unison crank 128c may partially receive the rotational pin 248. An eccentric pin recess 194 may receive and engage an eccentric pin 192 extending from the annular unison ring 136, 136a.

Figure 13:
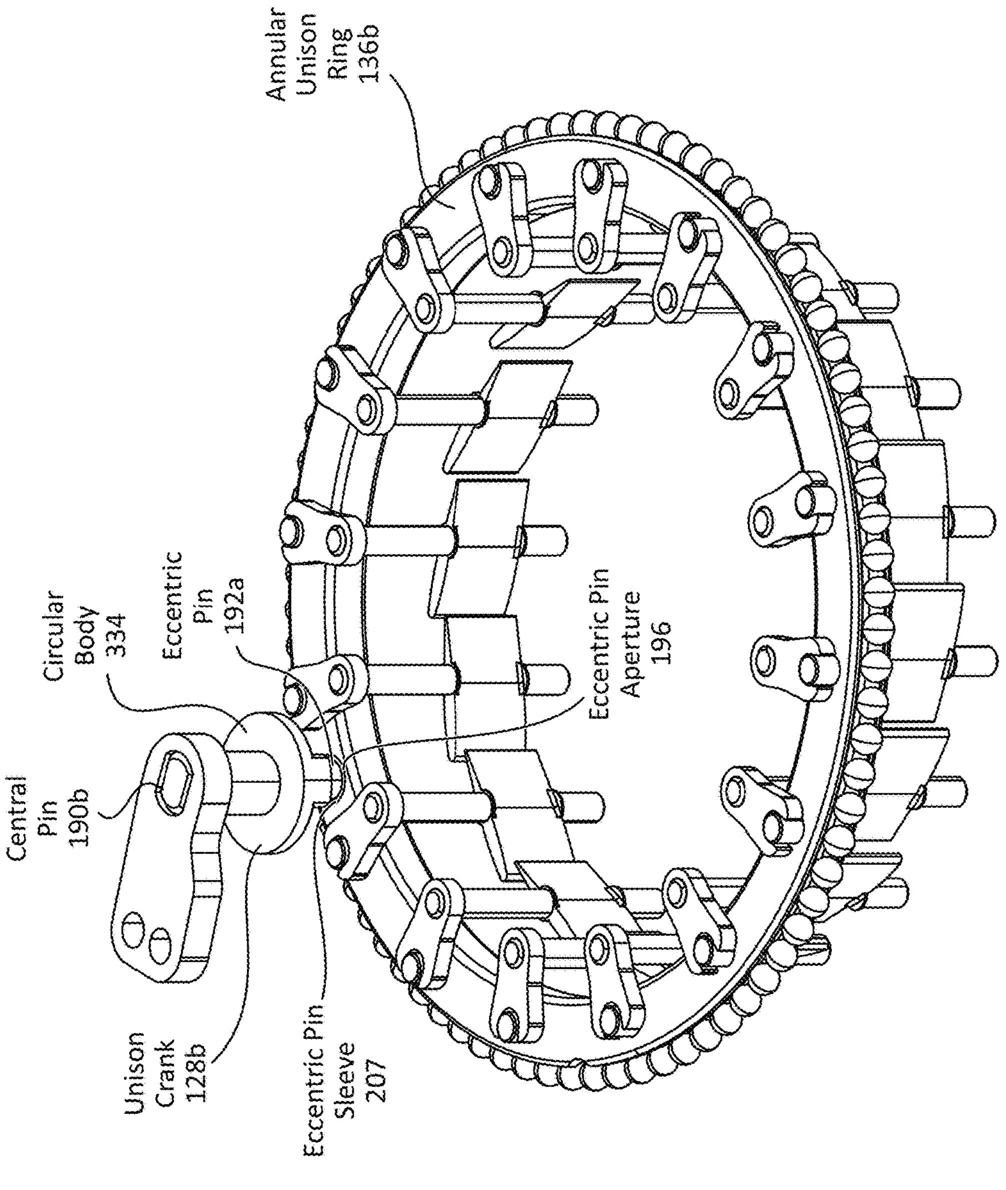
FIG. 13 is in elevated, perspective view of the unison crank assembly including an eccentric pin disposed within an eccentric pin aperture of an annular unison ring.

As illustrated in FIG. 13, the eccentric pin 192a and eccentric pin sleeve 207 of the unison crank 128b could engage with an eccentric pin aperture 196 in the annular unison ring 136b.

Various features of the disclosed unison crank assemblies 219, 219a, 219b, 219c may be utilized in combinations not illustrated in FIGS. 12A-12D. For example, the central pin sleeve 391 could be used with the unison crank assemblies 219b, 219c of FIGS. 12C-12B. Also, the eccentric pin sleeve 207 could be utilized with the unison crank assembly 219c shown in FIG. 12D. Those skilled in the art will appreciate that the unison crank assemblies 219, 219a, 219b, 219c shown in the figures are merely illustrative and various features and components illustrated in the assemblies 219, 219a, 219b, 219c may be arranged and combined to translate the linear motion of the actuator 116 and trigger rotational movement of the annular unison ring 136, 136a, 136b.

FIG. 14

Figure 14:
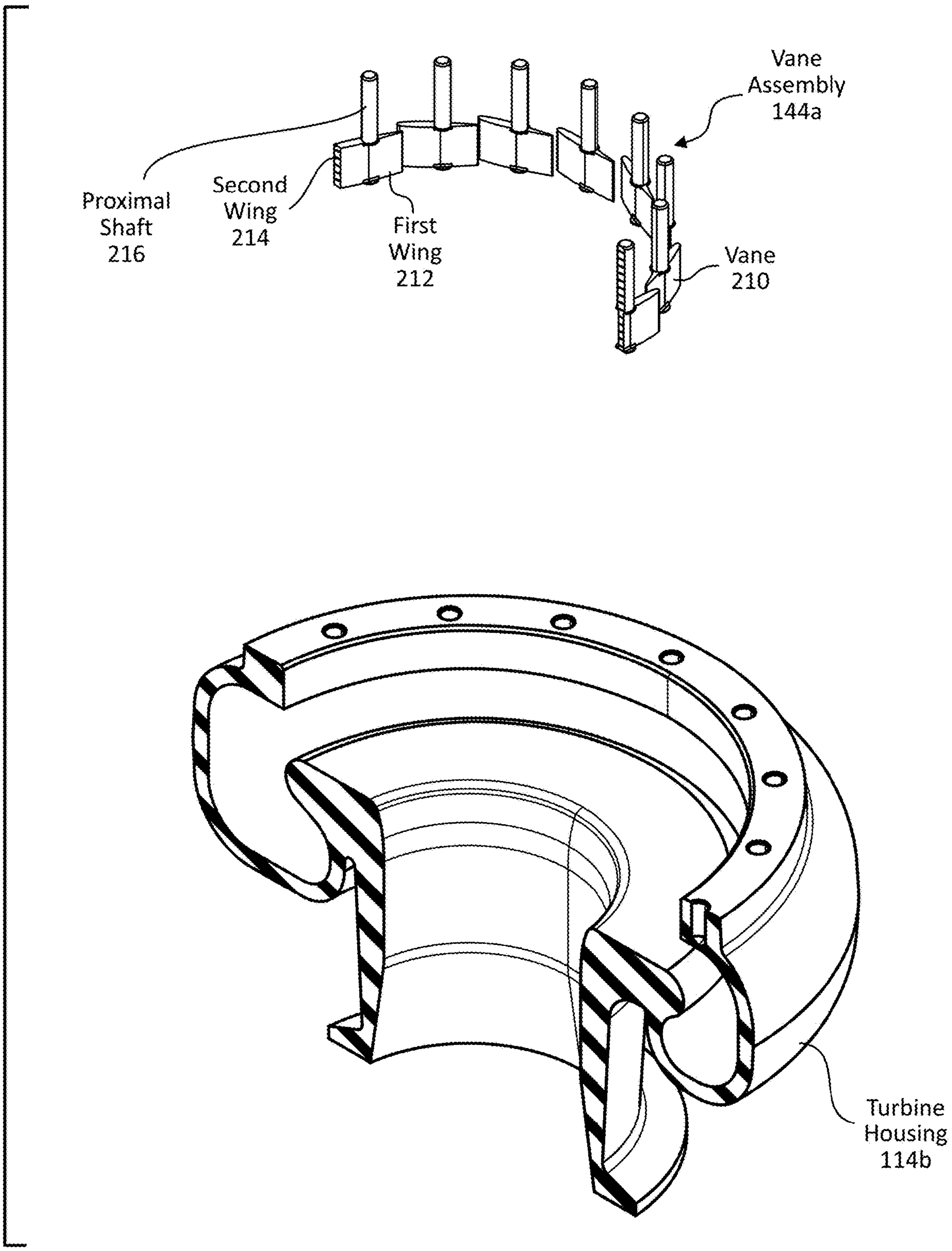
FIG. 14 is an exploded view of a set of vane assemblies without a distal shaft, a turbine wheel, and a turbine housing.

FIG. 14 illustrates portions of an alternative embodiment of a turbocharger or turbocharger component in which each vane assembly 144a is devoid of a distal shaft 218. Thus, each vane assembly 144a includes a proximal shaft 216 and a vane 210, which may comprise a first wing 212 and a second wing 214 but does not include a distal shaft 218. Please note, as illustrated, the turbine housing 114b may be devoid of secondary vane apertures 151. In this embodiment, the engagement of the proximal shaft 216 with each vane arm 132 is sufficiently strong to retain the vane in the desired position and rotational orientations without either a distal shaft 218 or a secondary vane aperture 151.

CONCLUSION

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims, if any, present elements of the various steps in a sample order and are not meant to be limited to the specific order or hierarchy presented.

Various components disclosed herein may be made, for example, of stainless steel, ductile iron, cast-iron, or plain steel.

It should be noted that the components illustrated in the figures are merely examples of the claimed subject matter. For example, the shape of the turbine housing 114, 114a and compressor housing 110 may be varied within the scope of the disclosed and claimed subject matter. Additionally, the configuration of the vane assemblies 144, 144a may also be varied within the scope of the disclosed and claimed subject matter. For example, the first and second wings 212, 214 of one or more vanes 210 may be of different non-symmetrical sizes or shapes. A guide pin 119, 149 may comprise, for example, a dowel or roll pin. As used herein, a "turbocharger component" comprises any subpart or set of subparts of a turbocharger, such as the portion of the turbocharger 100 illustrated in FIG. 4A or any other subpart of the turbocharger 100 or the portion of the turbocharger 100a illustrated in FIG. 11B. In addition, various portions of the design may be integrally formed or separately formed. For example, in various embodiments, a discrete second nozzle ring 155a may be separate and distinct from the turbine housing 114a and may be rotatably disposed within a second annular groove 170 of the turbine housing 114a. In addition, the configuration of the set of ball bearings 225, within an inward-facing race 232 and outward-facing race 231, may be varied within the scope of the disclosed subject matter. For example, the positioning and or the number of the ball bearings, ball bearing springs and stop mechanisms may be used. Securing the first casing 242 to the second casing 240 can also be done through other mechanisms known in the art, such as v-band clamps or stamped manufacturing processes, which couples the two casings together. It should also be noted that many of the parts illustrated in the figures may be integrally formed with other parts or may be secured together using mechanisms or methods other than those indicated in the figures and description, such as welding, adhesives, and/or stamping processes. In addition, vane assemblies 144 without a distal shaft 218 may be incorporated and utilized into various embodiments of the turbocharger (e.g., the turbocharger 100) or turbocharger component (e.g., a portion of a turbocharger 100a) disclosed herein.

As used herein, the term "operational mode" signifies a mode in which the turbocharger 100, 100a operates in response to an engine or is assembled to perform the specified operations whether inside or outside of a vehicle. The "assembly mode" is a mode during which the set of ball bearings 225 are being inserted into the bearing race 157, 157a.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

The invention claimed is:

1. A turbocharger or turbocharger component comprising:

an annular unison ring comprising an outward-facing surface and an outward-facing race disposed on the outward-facing surface;

a first nozzle ring comprising an inward-facing circular wall, the inward-facing circular wall comprising an inward-facing race, the inward-facing race and the outward-facing race defining a bearing race;

a set of ball bearings disposed within the bearing race, wherein, when the turbocharger or turbocharger component is in an operational mode, the annular unison ring rotationally engages the first nozzle ring via the set of ball bearings, wherein the annular unison ring is devoid of direct contact with the first nozzle ring;

a plurality of vane assemblies, each vane assembly comprising a vane, wherein each vane assembly is engaged with the annular unison ring such that rotation of the annular unison ring causes rotation of each vane assembly when the turbocharger or turbocharger component is in the operational mode;

the annular unison ring defining an inner insertion recess; and the inward-facing circular wall defining an outer insertion recess, wherein the inner insertion recess and the outer insertion recess, when rotationally aligned, define a ball bearing insertion recess through which a ball bearing of the set of ball bearings may be inserted into the bearing race, wherein, in the operational mode, rotation of the annular unison ring relative to the first nozzle ring is limited such that the inner insertion recess and the outer insertion recess cannot be rotationally aligned in this mode.

2. The turbocharger or turbocharger component of claim 1, wherein the first nozzle ring has an outer annular nozzle ring surface and an inner annular nozzle ring surface on a first side of the first nozzle ring, wherein the turbocharger or turbocharger component further comprises:

a plurality of vane apertures extending through the first nozzle ring from the inner annular nozzle ring surface to an opposite annular ring surface disposed on a second side of the first nozzle ring;

a rotational recess disposed in the outer annular nozzle ring surface and disposed adjacent to the annular unison ring;

a plurality of unison pins extending away from a first unison ring surface of the annular unison ring;

an eccentric pin;

a unison crank rotatably having a rotational pin rotatably disposed within the rotational recess, wherein the eccentric pin is coupled to the rotational pin and is offset from a rotational axis of the unison crank such that rotation of the unison crank about the rotational axis causes movement of the eccentric pin, which, in turn, causes the annular unison ring to rotate;

each vane assembly further comprising a proximal shaft with the vane extending away from the proximal shaft, wherein each vane comprises a first wing and a second wing;

the plurality of vane apertures being shaped and sized to receive one of the proximal shafts of the plurality of vane assemblies such that each vane assembly is rotatably disposed in a respective vane aperture about a respective common longitudinal axis; and a plurality of vane arms, each vane arm having a first end and a second end, each first end pivotally attached to one of the plurality of unison pins of the annular unison ring, each second end fixedly attached to the proximal shaft of one of the vane assemblies such that rotation of the annular unison ring causes each of the plurality of vane arms to pivot and the vane assemblies to rotate about each respective common longitudinal axis.

3. The turbocharger or turbocharger component of claim 2, wherein the unison crank further comprising a forked member that engages with the eccentric pin.

4. The turbocharger or turbocharger component of claim 3, wherein the rotational pin is integrally formed with at least a portion of the unison crank.

5. The turbocharger or turbocharger component of claim 3, wherein the rotational pin is disposed within a rotational pin recess of the unison crank.

6. The turbocharger or turbocharger component of claim 2, wherein the eccentric pin is integrally formed with at least a portion of the unison crank.

7. The turbocharger or turbocharger component of claim 2, wherein each vane assembly further comprises a distal shaft, the turbocharger or turbocharger component further comprising:

a discrete second nozzle ring;

a turbine housing;

a plurality of fasteners for removably fixing the discrete second nozzle ring with respect to the turbine housing; and the discrete second nozzle ring comprising a plurality of secondary vane apertures, each secondary vane aperture sized and shaped to receive one of the distal shafts of the plurality of vane assemblies such that each distal shaft is rotatably disposed in a respective secondary vane aperture with each vane disposed between the first nozzle ring and the discrete second nozzle ring, wherein the first nozzle ring is repositionable and fixable at different rotational orientations with respect to the discrete second nozzle ring.

8. The turbocharger or turbocharger component of claim 2, wherein each vane assembly further comprises a distal shaft, the turbocharger or turbocharger component further comprising:

an integrated second nozzle ring comprising a portion of a turbine housing, the integrated second nozzle ring comprises a plurality of secondary vane apertures, each secondary vane aperture sized and shaped to receive one of the distal shafts of the plurality of vane assemblies such that each distal shaft is rotatably disposed in a respective secondary vane aperture with each vane disposed between the first nozzle ring and the integrated second nozzle ring.

9. A method of assembling the turbocharger or turbocharger component of claim 1, further comprising an arcuate gap intermediate the inward-facing race and the outward-facing race, the method comprising a first stage assembly mode and a second stage assembly mode:

wherein in the first stage assembly mode, the arcuate gap is sufficiently large to enable insertion of a ball bearing of the set of ball bearings into the bearing race regardless of whether the inner insertion recess is rotationally aligned with the outer insertion recess; and wherein in the second stage assembly mode, no portion of the arcuate gap is sufficiently large to enable insertion of a ball bearing of the set of ball bearings into the bearing race except through the ball bearing insertion recess formed by rotational alignment of the inner insertion recess in the outer insertion recess.

10. The method of claim 9, wherein transition from the first stage assembly mode to the second stage assembly mode is realized as a sufficient number of ball bearings are inserted into the bearing race and positioned to constrain movement of the annular unison ring within the arcuate gap such that no portion of the arcuate gap is sufficiently large to enable insertion of a ball bearing of the set of ball bearings into the bearing race except through the ball bearing insertion recess formed by rotational alignment of the inner insertion recess and the outer insertion recess.

* * * * *